US011243644B2

(12) United States Patent
Ju et al.

(10) Patent No.: US 11,243,644 B2
(45) Date of Patent: Feb. 8, 2022

(54) TOUCH DISPLAY DEVICE AND TOUCH SENSING CIRCUIT

(71) Applicant: LG Display Co., Ltd., Seoul (KR)

(72) Inventors: Suyun Ju, Gangwon-do (KR); HyungUk Jang, Gyeonggi-do (KR); Sungsu Han, Gyeonggi-do (KR); DoYoung Jung, Seoul (KR); SangHyuck Bae, Seoul (KR); Jongsung Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/726,530

(22) Filed: Dec. 24, 2019

(65) Prior Publication Data

US 2020/0210021 A1 Jul. 2, 2020

(30) Foreign Application Priority Data

Dec. 28, 2018 (KR) .......................... 10-2018-0173152

(51) Int. Cl.
*G06F 3/041* (2006.01)
*G06F 3/038* (2013.01)
*G06F 3/0354* (2013.01)
*G06F 3/0484* (2013.01)
*G06F 3/044* (2006.01)

(52) U.S. Cl.
CPC .. *G06F 3/0442* (2019.05); *G06F 2203/04104* (2013.01)

(58) Field of Classification Search
CPC .................. G06F 3/0442; G06F 2203/04104
See application file for complete search history.

(56) References Cited

U.S. PATENT DOCUMENTS

| 2012/0306927 A1* | 12/2012 | Lee ..................... G06F 3/03545 |
| | | 345/660 |
| 2014/0028576 A1* | 1/2014 | Shahparnia ......... G06F 3/04162 |
| | | 345/173 |
| 2015/0154444 A1* | 6/2015 | Kurita ................ G06K 9/00436 |
| | | 715/268 |
| 2016/0209944 A1* | 7/2016 | Shim ..................... G06F 3/0442 |
| 2016/0246390 A1* | 8/2016 | Lukanc ............... G06F 3/04162 |

(Continued)

OTHER PUBLICATIONS

JP Office Action dated May 31, 2021 issued in Japanese Patent Application No. 2019-223341 w/English Translation (10 pages).

*Primary Examiner* — Lin Li
(74) *Attorney, Agent, or Firm* — Polsinelli PC

(57) ABSTRACT

A touch display device comprises a touch panel including a plurality of touch electrodes; and a touch driving circuit configured to sense one or more of the plurality of touch electrodes, wherein the touch driving circuit has an operation period including a plurality of touch intervals that includes a first sensing interval and a second sensing interval, and the first sensing interval includes at least a first time division sensing interval and the second sensing interval includes at least a second time division sensing interval, and wherein the touch driving circuit is configured to detect a pen signal output from a first pen through one or more touch electrodes of the plurality of touch electrodes during the first time division sensing interval, and detect a pen signal output from a second pen through one or more touch electrodes of the plurality of touch electrodes during the second time division sensing interval.

21 Claims, 31 Drawing Sheets

(56) References Cited

U.S. PATENT DOCUMENTS

| | | | | |
|---|---|---|---|---|
| 2017/0131798 A1* | 5/2017 | Geaghan | ............. | G06F 3/04162 |
| 2017/0192591 A1* | 7/2017 | Jang | ...................... | G06F 3/0383 |
| 2017/0285773 A1* | 10/2017 | Ayzenberg | ............ | G06F 3/0442 |
| 2017/0308184 A1* | 10/2017 | Kato | ................... | G06F 3/04847 |
| 2018/0004324 A1* | 1/2018 | Park | ...................... | G06F 3/0412 |
| 2018/0081492 A1* | 3/2018 | Kim | ...................... | G06F 3/0488 |
| 2018/0113519 A1* | 4/2018 | Yamamoto | .......... | G06F 3/03545 |
| 2019/0004621 A1* | 1/2019 | Nuber | ..................... | G06F 3/038 |
| 2019/0079632 A1* | 3/2019 | He | ...................... | G06F 3/04162 |

\* cited by examiner

FIG.11

| TOUCH OBJECT | Finger | Pen | | | |
|---|---|---|---|---|---|
| KIND OF LHB | F | B | P | T | D |
| TSP (ULS) | TDC | BCON | DC | DC | DC |
| Pen (DLS) | PENS | | PENS | PENS | DATA |

FIG. 15

| Frame #1 | | | | Frame #2 | | | |
|---|---|---|---|---|---|---|---|
| LHB 6 | LHB 7 | LHB 10 | LHB 11 | LHB 6 | LHB 7 | LHB 10 | LHB 11 |
| Pen #1 DATA | | Pen #2 DATA | | Pen #3 DATA | | Pen #4 DATA | |

*FIG.20*

Pen #1, Pen #2 → SF = F1
Pen #3, Pen #4 → SF = F2

| Frame #1 (OF=F1) | | | | Frame #2 (OF=F2) | | | |
|---|---|---|---|---|---|---|---|
| LHB 6 | LHB 7 | LHB 10 | LHB 11 | LHB 6 | LHB 7 | LHB 10 | LHB 11 |
| Pen #1 DATA | Pen #2 DATA | | | Pen #3 DATA | Pen #4 DATA | | |
| ~~Pen #3 DATA~~ | ~~Pen #4 DATA~~ | | | ~~Pen #1 DATA~~ | ~~Pen #2 DATA~~ | | |

FIG.27

<FINGER MODE>

| LHB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| KIND OF LHB | B | F | F | F | F | F | P | B | F | F | F | F | F | P | P | P |

<PEN MODE>

| LHB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| KIND OF LHB | B | P | T | F | P | D | D | F | P | D | D | F | P | T | F | F |

<PEN ID MODE>

| LHB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| KIND OF LHB | B | P | D | F | P | D | D | F | P | D | D | F | P | D | F | F |

<SEARCH MODE>

| LHB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| KIND OF LHB | B | P | P | P | P | P | F | B | P | P | P | P | P | F | F | F |

· B: BEACON SENSING INTERVAL
· F: FINGER SENSING INTERVAL
· P: POSITION SENSING INTERVAL
· T: TILT SENSING INTERVAL
· D: DATA SENSING INTERVAL

TOUCH DISPLAY DEVICE AND TOUCH SENSING CIRCUIT

CROSS REFERENCE TO RELATED APPLICATION

This application claims priority from Korean Patent Application No. 10-2018-0173152, filed on Dec. 28, 2018, which is hereby incorporated by reference in its entirety.

BACKGROUND

Field of the Disclosure

The present disclosure relates to a display device, and more particularly, to a display device and a touch sensing circuit.

Description of the Background

As the information society develops, various requirements for touch displays for displaying an image are increasing, and in recent years, various display devices such as liquid crystal display devices and organic light emitting display devices have been utilized.

The display device has moved away from using a general input scheme, such as buttons, a keyboard, and a mouse, and provides a touch-based input scheme that allows the user to easily input information and commands intuitively and conveniently.

As requirements for a touch input by a pen, in addition to a finger, has increased, a pen touch technology also has developed. However, there is considerable difficulty in efficiently providing a touch by a finger and a touch by a pen together while basically providing a display function by a touch display device.

SUMMARY

An aspect of the present disclosure is to provide a touch display device that can effectively sense two or more pens, and a touch sensing circuit.

Another aspect of the present disclosure is to provide a touch display device that can perform multiplexing, by which sensing speed may be increased, and a touch sensing circuit.

Another aspect of the present disclosure is to provide a touch display device that can increase pen search speed, and a touch sensing circuit.

Another aspect of the present disclosure is to provide a touch display device that can prevent distortion of the position of a pen, and a touch sensing circuit.

In an aspect, aspects of the present disclosure may provide a touch display device including a touch panel including a plurality of touch electrodes, and a touch driving circuit configured to sense one or more of the plurality of touch electrodes.

An operation period of the touch driving circuit includes a plurality of touch intervals. The plurality of touch intervals includes a first sensing interval and a second sensing interval.

The first sensing interval may include a first time division sensing interval and a third time division sensing interval, and the second sensing interval may include a second time division sensing interval and a fourth time division sensing interval.

The touch driving circuit may detect a pen signal output from a first pen through one or more touch electrodes during the first time division sensing interval.

The touch driving circuit may detect a pen signal output from a second pen, which is different from the first pen, through one or more touch electrodes during the second time division sensing interval.

The touch driving circuit may be configured to detect a signal at a first operation frequency during the first time division sensing interval, detect a signal at a second operation frequency, which is different from the first operation frequency, during the third time division sensing interval, and detect a pen signal output from the first pen and having the first signal frequency through one or more touch electrodes during the first time division sensing interval.

The touch driving circuit may be configured to detect a signal at the first operation frequency during the second time division sensing interval, detect a signal at the second operation frequency during the fourth time division sensing interval, and detect a pen signal output from the second pen and having the second signal frequency through one or more touch electrodes during the second time division sensing interval.

The first operation frequency and the first signal frequency may be the same.

When a third pen, which is different from the first pen and the second pen, is discovered, the touch driving circuit may be configured to detect a signal at a first operation frequency during the first time division sensing interval, detect a signal at the second operation frequency during the third time division sensing interval, and detect a pen signal output from the third pen and having a second signal frequency, which is different from the first signal frequency, through one or more touch electrodes during the third time division sensing interval. The second operation frequency and the second signal frequency may be the same.

The first and second sensing intervals may be first and second position sensing intervals and the first to fourth time division sensing intervals may be first to fourth time division position sensing intervals.

The first and second sensing intervals may be first and second tilt sensing intervals and the first to fourth time division sensing intervals may be first to fourth time division tilt sensing intervals.

The plurality of touch intervals may further include a first data sensing interval, a second data sensing interval, a third data sensing interval, and a fourth data sensing interval.

The touch driving circuit may be configured to detect data output from the first pen through one or more touch electrodes during a the first data sensing interval, and may detect data output from the second pen through one or more touch electrodes during the second data sensing interval.

The touch driving circuit may be configured to detect data output from the first pen and having the first signal frequency through one or more touch electrodes by detecting data at the first operation frequency during the first data sensing interval, and detect data output from the second pen and having the first signal frequency through one or more touch electrodes by detecting data at the first operation frequency during the second data sensing interval. The first operation frequency and the first signal frequency may be the same.

When a third pen, which is different from the first pen and the second pen, is discovered, the touch driving circuit may be configured to detect data at a second operation frequency, which is different from the first operation frequency, during the third data sensing interval, detect data output from the third pen and having a second signal frequency, which is different from the first signal frequency, through one or more touch electrodes, and detect data at the second operation frequency during the fourth data sensing interval. The second operation frequency and the second signal frequency may be the same.

The first data sensing interval and the second data sensing interval may be included in a first frame period, and the third data sensing interval and the fourth data sensing interval may be included in a second frame period, which is different from the first frame period.

The data output from the first pen may include a pen ID of the first pen, and the data output from the second pen may include a pen ID of the second pen.

The temporal lengths of the first to fourth time division sensing intervals may be shorter than the temporal lengths of the first to fourth data sensing intervals.

The touch driving circuit may be configured to detect a signal through a first touch electrode group of the touch panel during the first time division sensing interval, and detect a signal through a second touch electrode group of the touch panel during the third time division sensing interval.

The touch driving circuit may be configured to detect a signal through a first touch electrode group of the touch panel during the second time division sensing interval, and detect a signal through a second touch electrode group of the touch panel during the fourth time division sensing interval.

Touch electrodes included in the first touch electrode group and touch electrodes included in the second touch electrode group may be touch electrodes located in different areas of the touch panel.

Touch electrodes included in the first touch electrode group and touch electrodes included in the second touch electrode group may be the same touch electrodes.

The touch display device may further include a touch controller configured to, based on a reference touch synchronization signal in which a first state interval defining a touch interval and a second state interval defining a non-touch interval are repeated, generate a touch synchronization signal in which a first voltage level interval and a second voltage level interval are repeated, and supply the touch synchronization signal to the touch driving circuit.

One first state interval in the reference touch synchronization signal may correspond to two or more first voltage level intervals and one or more second voltage level intervals.

One of the two or more first voltage level intervals may include the first time division sensing interval and the third time division sensing interval, and another of the two or more first voltage level intervals may include the second time division sensing interval and the fourth time division sensing interval.

Operation modes of the touch display device may include a search mode which is a default mode and operates when no touch input by a finger and a pen is made, a pen ID mode for receiving a pen ID when a touch input by the pen is made, a pen mode for sensing one or more of the position, the tilt, and data of the pen if the pen ID is received, and a finger mode for sensing a touch by the finger if a touch input by the finger is made, and the first sensing interval and the second sensing interval may correspond to touch intervals when the touch driving circuit is in a pen mode.

During the search mode, K touch intervals in one frame period may include one or more beacon transmission intervals, n or more finger sensing intervals, and m pen position sensing intervals. Then, n≥1, m≥1, and K≥3.

During the n or more finger sensing intervals, a touch driving signal, the voltage level of which swings, may be applied to the plurality of touch electrodes, and during the m pen position sensing intervals, a DC voltage may be applied to the plurality of touch electrodes.

Each of the plurality of touch intervals may include three or more division intervals, a pen signal including a plurality of pulses may be applied to one or more touch electrodes in each of the three or more division electrodes, and a plurality of pulses included in a pen signal in each of the three division intervals may express one symbol.

The touch driving circuit may detect a signal based on pen pulses during a period, except for a symbol change time point related to position sensing.

In another aspect, aspects of the present disclosure may provide a touch display device including a touch panel including a plurality of touch electrodes and configured to receive pen signals output from two or more pens, and a touch driving circuit configured to detect a pen signal output from the two or more pens by sensing one or more of the plurality of touch electrodes.

The pen signals output from the two or more pens may have different signal frequencies.

The touch driving circuit may be configured to detect a signal by sequentially operating at two or more operation frequencies, and detect a pen signal having the same signal frequency as an operation frequency corresponding to a first timing through one or more touch electrodes.

In another aspect, aspects of the present disclosure may provide a touch sensing circuit including a first circuit (may be a touch driving circuit) configured to sense one or more of a plurality of touch electrodes disposed in a touch panel and output sensing data, and a second circuit (may be a touch controller) configured to sense one or more of the position, the tilt, and additional information of a pen based on the sensing data.

An operation period of the first circuit may include a plurality of touch intervals, the plurality of touch intervals may include a first sensing interval and a second sensing interval, the first sensing interval may include a first time division sensing interval and a third time division sensing interval, and the second sensing interval may include a second time division sensing interval and a fourth time division sensing interval.

The first circuit may be configured to detect a pen signal output from a first pen through one or more touch electrodes during the first time division sensing interval, and detect a pen signal output from a second pen, which is different from the first pen, through one or more touch electrodes during the second time division sensing interval.

The first circuit may be configured to detect a signal at a first operation frequency during the first time division sensing interval, detect a signal at a second operation frequency, which is different from the first operation frequency, during the third time division sensing interval, detect a pen signal output from the first pen and having the first signal frequency through one or more touch electrodes during the first time division sensing interval.

The first circuit may be configured to detect a signal at the first operation frequency during the second time division sensing interval, detect a signal at the second operation frequency during the fourth time division sensing interval, and detect a pen signal output from the second pen and having the first signal frequency through one or more touch electrodes during the second time division sensing interval.

The first operation frequency and the first signal frequency may be the same.

According to an aspect of the present disclosure, a touch display device that can effectively sense two or more pens, and a touch sensing circuit can be provided.

According to another aspect of the present disclosure, a touch display device that performs multiplexing, by which sensing speed may be increased, and a touch sensing circuit can be provided.

According to another aspect of the present disclosure, a touch display device that can increase pen search speed, and a touch sensing circuit can be provided.

According to another aspect of the present disclosure, a touch display device that can prevent distortion of the position of a pen, and a touch sensing circuit can be provided.

BRIEF DESCRIPTION OF THE DRAWINGS

The above and other aspects, features and advantages of the present disclosure will be more apparent from the following detailed description taken in conjunction with the accompanying drawings, in which:

FIG. 11 is a view illustrating a signal applied to a touch panel and a signal output from a pen during bidirectional communication between the pen and the touch panel, for pen sensing by a touch display device according to aspects of the present disclosure;

FIGS. 13 to 15 are views illustrating a time division driving scheme for multi-pen sensing by a touch display device according to aspects of the present disclosure;

FIGS. 16 to 20 are views illustrating a time division/multi-frequency driving scheme for multi-pen sensing by a touch display device according to aspects of the present disclosure;

FIG. 27 is a diagram of driving timings for operation modes of a touch display device according to aspects of the present disclosure;

DETAILED DESCRIPTION

Figure 1:
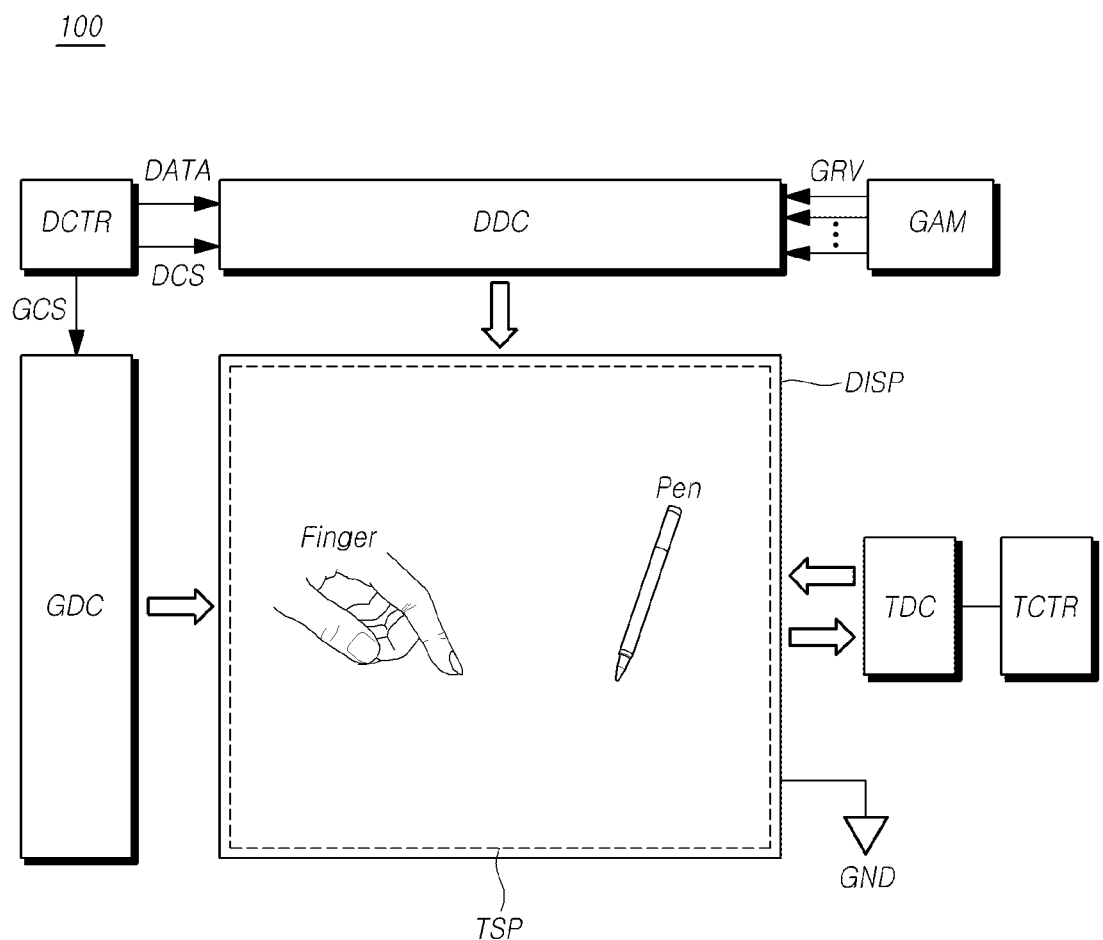
FIG. 1 is a system diagram of a touch display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
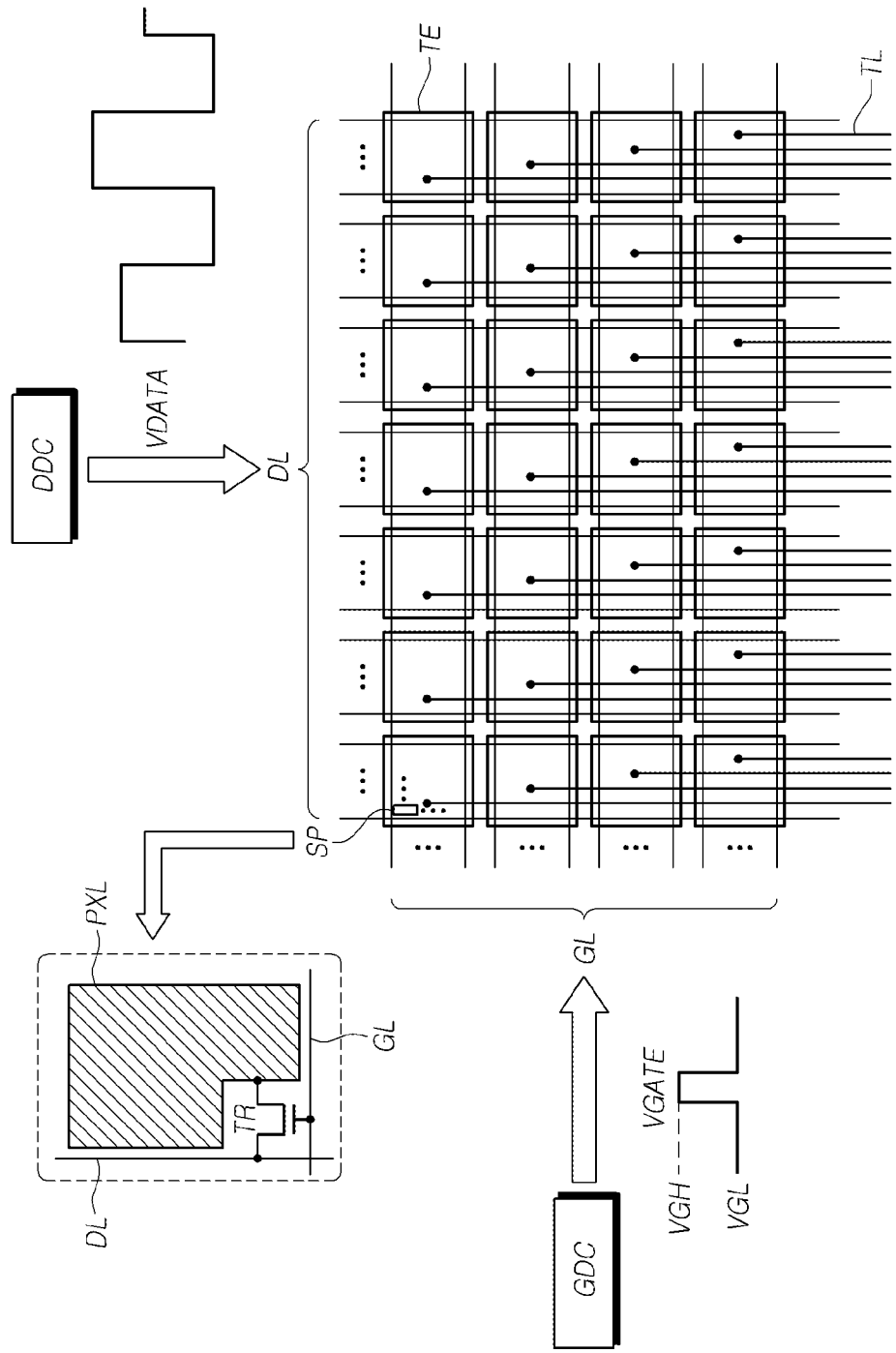
FIG. 2 is a view illustrating a display part of a touch display device according to aspects of the present disclosure.
Figure 3:
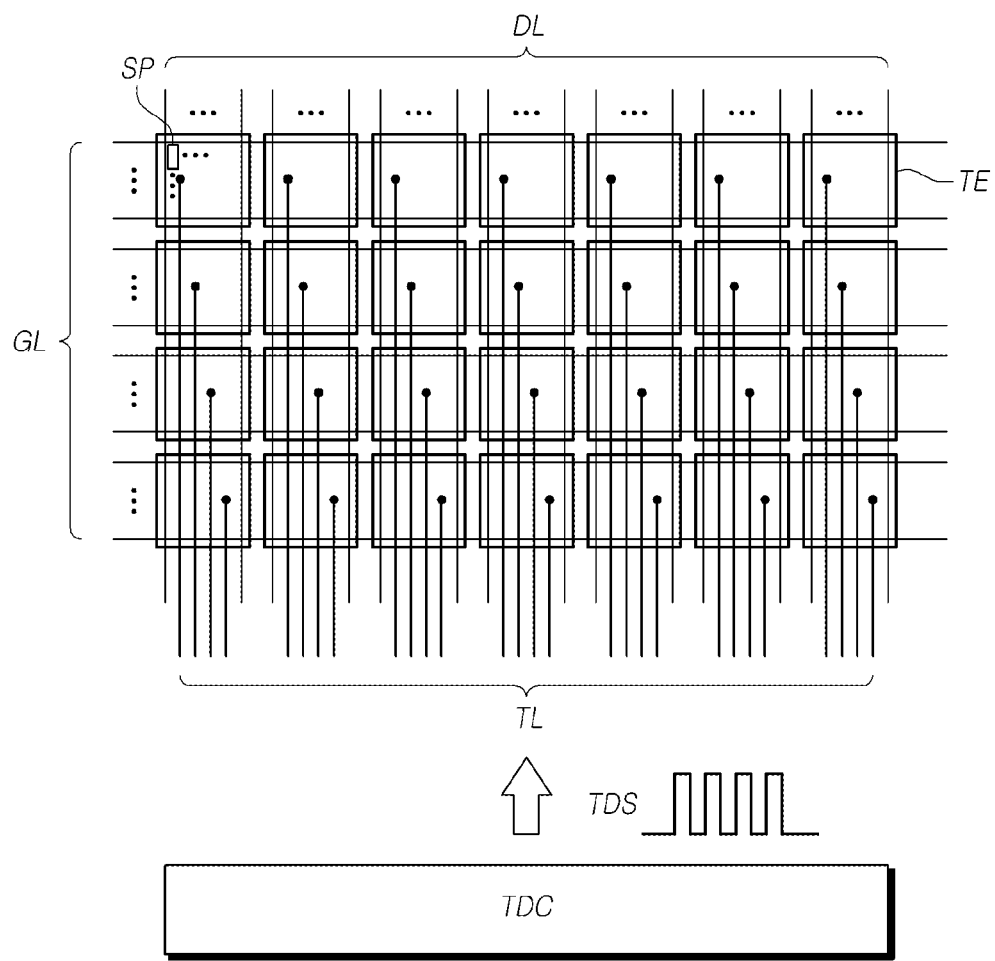
FIG. 3 is a view illustrating a touch sensing part of a touch display device according to aspects of the present disclosure.

FIG. 1 is a system diagram of a touch display device 100 according to aspects of the present disclosure. FIG. 2 is a view illustrating a display part of a touch display device 100 according to aspects of the present disclosure. FIG. 3 is a view illustrating a touch sensing part of a touch display device 100 according to aspects of the present disclosure;

Referring to FIG. 1, the touch display device 100 according to the aspects of the present disclosure may provide a display function of displaying an image. In addition, the touch display device 100 according to aspects of the present disclosure may provide a touch sensing function of sensing a touch of a finger of a user and/or a pen, and a touch input function of performing input processing according to the touch of the finger of the user and/or the pen by using a touch sensing result.

Referring to FIGS. 1 and 2, the touch display device 100 according to the aspects of the present disclosure, in order to provide a display function, may include a display panel DISP in which a plurality of data lines DL and a plurality of gate lines GL may be disposed, and a plurality of sub-pixels SP defined by the plurality of data lines DL and the plurality of gate lines GL are arranged, and display driving circuits for driving the display panel DISP.

Referring to FIGS. 1 and 2, each of the display driving circuits may include a data driving circuit DDC that drives a plurality of data lines DL, a gate driving circuit GDC that drives a plurality of gate lines GL, and a display controller DCTR that controls the data driving circuit DDC and the gate driving circuit GDC.

Referring to FIGS. 1 and 3, the touch display device 100 according to the aspects of the present disclosure may include a touch panel TSP in which a plurality of touch electrodes TE are disposed to provide a touch sensing function, a touch driving circuit TDC that drives and senses the touch panel TSP, and a touch controller TCTR that detects (senses) whether there is a touch by a pointer of the user and/or a touch position by using touch sensing data corresponding a sensing result of the touch driving circuit TDC. The structure including the touch driving circuit TDC and the touch controller TCTR may be called a touch sensing circuit.

The pointer of the user may be a finger or a pen.

The pen may be a passive pen having no signal transmission/reception function or an active pen having a signal transmission/reception function.

Referring to FIG. 2, a plurality of data lines DL disposed in a row direction (or a column direction) and a plurality of gate lines GL disposed in a column direction (or a row direction) may be disposed in the display panel DISP.

Referring to FIG. 3, a plurality of touch electrodes TE, and a plurality of touch lines TL for electrically connecting the plurality of touch electrodes TE and the touch driving circuit TDC may be disposed in the touch panel TSP.

The touch driving circuit TDC may apply a touch driving signal TD to all or some of the plurality of touch electrodes TE, and may sequentially sense all or some of the plurality of touch electrodes TE.

As an example, the plurality of touch electrodes TE may be arranged in a matrix form.

The plurality of touch electrodes TE may be in various forms. For example, one touch electrode TE may be a plate-shaped electrode having no opening, or may be an electrode in a mesh form having openings, and may be an electrode in a form having several bending parts.

When the touch electrode TE is a plate-shaped electrode, it may be a transparent electrode. When the touch electrode TE is an electrode in a mesh form or an electrode having a bent form, it may be an opaque electrode.

The touch panel TSP may be present outside the display panel DISP, and may be embedded in the display panel DISP. In the following, for convenience of description, it will be assumed that the touch panel TSP is embedded in the display panel DISP.

Each of the plurality of touch electrodes TE may be superimposed with two or more sub-pixels SP.

As an example, the plurality of touch lines TL may be disposed parallel to a plurality of data lines DL.

A touch driving circuit TDC for driving the plurality of touch electrodes TE may be further included.

The touch driving circuit TDC may supply a common voltage VCOM to the plurality of touch electrodes TE through a plurality of touch lines TL.

The display controller DCTR controls the data driving circuit DDC and the gate driving circuit GDC by supplying various control signals DCS and GCS to the data driving circuit DDC and the gate driving circuit GDC.

The display controller DCTR starts scanning according to times implemented in respective frames, converts input image data input from the outside according to a data signal format used in the data driving circuit DDC, outputs the converted digital image data DATA, and controls data driving at a suitable time according to the scanning.

The gate driving circuit GDC sequentially supplies gate signals of an on voltage or an off voltage to the plurality of gate lines GL according to a control of the display controller DCTR.

If a specific gate line GL is opened by the gate driving circuit GDC, the data driving circuit DDC converts the image data signal received from the display controller DCTR to an image analog signal, and supplies a data signal VDATA corresponding to the image analog signal to the plurality of data lines DL.

The display controller DCTR may be a timing controller used in a general display technology, may be a control device including the timing controller, which further performs other control functions, or may be a control device that is different from the timing controller.

The display controller DCTR may be implemented by a separate component from the data driving circuit DDC, and may be implemented by an integrated circuit together with the data driving circuit DDC.

The data driving circuit DDC drives the plurality of data lines DL by supplying data signals VDATA to the plurality of data lines DL. The data driving circuit DDC also may be called 'a source driver'.

The data driving circuit DDC may include at least one source driver integrated circuit SDIC. Each source driver integrated circuit SDIC may include a shift register, a latch circuit, a digital-analog converter DAC, and an output buffer circuit. Each source driver integrated circuit SDIC may further include an analog to digital converter ADC according occasions.

Each source driver integrated circuit SDIC may be a bonding pad of the display panel DISP in a tape automated bonding scheme or a chip on glass scheme, may be directly disposed in the display panel DISP, and may be integrated and disposed in the display panel DISP according to occasion. Each source driver integrated circuit SDIC may be implemented in a chip on film COF scheme mounted on a film connected to the display panel DISP.

The gate driving circuit GDC sequentially drives the plurality of gate lines GL by sequentially supplying gate signals VGATE (also called a scan voltage, a scan sigal, or a gate voltage) to the plurality of gate lines. The gate driving circuit GDC also may be called 'a scan driver'.

The gate signals VGATE include off-level gate voltages, by which the corresponding gate lines GL are closed, and on-level gate voltages, by which the corresponding gate lines GL are opened.

In more detail, the gate signals VGATE include off-level gate voltages, by which the transistors connected to the corresponding gate lines GL are turned off, and on-level gate voltages, by which the transistors connected to the corresponding gate lines GL are turned on.

When the transistors are of N type, the off-level gate voltages are low-level gate voltages VGL and the on-level gate voltages are high-level gate voltages VGH. When the transistors are of P type, the off-level gate voltages are high-level gate voltages VGL and the on-level gate voltages are low-level gate voltages VGH. In the following, for convenience of description, it will be exemplified that the off-level gate voltages are low-level gate voltages VGL and the on-level gate voltages are high-level gate voltages VGH.

The gate driving circuit GDC may include at least one gate driver integrated circuit GDIC. Each gate driver integrated circuit GDIC may include a shift register and a level shifter.

Each gate driver integrated circuit GDIC may be a bonding pad of the display panel DISP in a tape automated bonding scheme TAB or a chip on glass scheme COG, may implemented in a gate in panel type GIP to be directly disposed in the display panel DISP, and may be integrated and disposed in the display panel DISP according to occasion. Each gate driver integrated circuit GDIC may be implemented in a chip on film COF scheme mounted on a film connected to the display panel DISP.

As in FIG. 1, the data driving circuit DDC may be located on one side (e.g., the upper side or the lower side) of the display panel DISP, and according to occasion, may be located both sides (e.g., the upper side and the lower side) of the display panel DISP depending on a driving scheme or a panel design scheme.

As in FIG. 1, the gate driving circuit GDC may be located on one side (e.g., the left side or the right side) of the display panel DISP, and according to occasion, may be located both sides (e.g., the left side and the right side) of the display panel DISP depending on a driving scheme or a panel design scheme.

The touch display device 100 according to the aspects may be display devices of various types, such as a liquid crystal display device and an organic light emitting display device. The display panel DISP according to the aspects may be display panels of various types, such as a liquid crystal display panel and an organic light emitting display panel.

Each sub-pixel SP disposed in the display panel DISP may include one or more circuit elements (e.g., a transistor and a capacitor).

For example, when the display panel DISP is a liquid crystal display panel, a pixel electrode PXL may be disposed in each sub-pixel SP, and a transistor TR may be electrically connected between the pixel electrode PXL and the data line DL. The transistor TR may be turned on by a gate signal VGATE supplied to a gate node through a gate line, and when being turned on, may apply a data signal VDATA to a pixel electrode PXL electrically connected to a drain node (or a source node) by outputting a data signal VDATA supplied to a source node (or a drain node) to the drain node (or the source node) through a data line DL. An electric field is generated between a pixel electrode PXL, to which the data signal VDATA is applied, and a common electrode, to which a common voltage VCOM is applied, and a capacitance is generated between the pixel electrode PXL and the common electrode.

The structure of each sub-pixel SP may be variously determined according to a panel type, a provision function, a design scheme, and the like.

The plurality of touch electrodes TE mentioned above correspond to a touch sensor, to which a touch driving signal TDS is applied when touch driving is performed by the touch driving circuit TDC, and which may be sensed by the touch driving circuit TDC.

The plurality of touch electrodes TE may be display driving electrodes, to which a data signal VDATA and a common voltage VCOM that generates an electric field when the display are driven, is applied.

Accordingly, when the touch driving is performed, a touch driving signal TDS may be applied to the touch electrodes TE, and when the display driving is performed, the common voltage VCOM may be applied to the touch electrodes TE.

When the display driving and the touch driving are performed at different timings, the touch electrodes TE function as the display driving electrodes during the display driving, and the touch electrodes TE function as a touch sensor during the touch driving.

As will be described below, if the display driving and the touch driving are simultaneously performed, the touch electrodes TE function as both the display driving electrodes and the touch sensor during a simultaneous driving period in which the display driving and the touch driving are simultaneously performed.

Referring to FIGS. 2 and 3, in a first touch electrode and a second touch electrode, among the plurality of touch electrodes, disposed in the same row, two or more data lines DL superimposed on the first touch electrode may be superimposed on the second touch electrode in the same way. However, two or more gate lines GL superimposed on the first touch electrode are not superimposed on the second touch electrode.

The plurality of touch lines TL include a first touch line for electrically connecting the first touch electrode and the touch driving circuit TDC, and a second touch line for electrically connecting the second touch electrode and the touch driving circuit TDC.

The first touch line and the second touch line are insulated from each other in the touch panel TSP. According to occasion, the first touch line and the second touch line may be electrically connected to each other in the touch driving circuit TDC.

The first touch line may be superimposed on the second touch electrode, and may be insulated from the second touch electrode in the touch panel TSP.

The touch controller TCTR, for example, may be implemented by a micro control unit (MCU), and a processor.

The display controller DCTR and the touch controller TCTR may be implemented separately or may be integrated to be implemented.

The touch display device 100 according to the aspects of the present disclosure may sense a touch based on a self-capacitance of the touch electrode TE, or may sense a touch based on a mutual-capacitance between the touch electrodes TE.

When the touch display device 100 according to the aspects of the present disclosure senses a touch based on the self-capacitance, the touch driving circuit TDC may supply a touch driving signal TDS in a form of a signal having a variable voltage level to one or more of the plurality of touch electrodes TE, may sense a touch sensing signal from the touch electrodes TE, to which, the touch driving signal is applied, and output sensing data, and the touch controller TCTR may calculate whether there is a touch and/or a touch position by using the sensing data.

When the touch display device 100 according to the aspects of the present disclosure senses a touch based on the mutual-capacitance, the touch driving circuit TDC may supply a touch driving signal TDS to, among the plurality of touch electrodes TE, a touch electrode functioning as a driving electrode, may sense a touch sensing signal from, among the pluralit of the touch electrodes TE, another touch electrode functioning as a sensing electrode, and output sensing data, and the touch controller TCTR may calculate whether there is a touch and/or a touch position by using the sensing data.

In the following, for convenience of description, it will be assumed that the touch display device 100 according to the aspects of the present disclosure senses a touch based on a self-capacitance.

The touch driving signal TDS output from the touch driving circuit TDC may be a signal having a predetermined voltage level, and may be a signal having a variable voltage level.

When the touch driving signal TDS is a signal having a variable voltage level, the touch driving signal TDS, for example, may be various signal waves, such as a sinusoidal wave form, a triangular wave form, or a spherical wave form.

The data driving circuit DDC may convert digital image data DATA received from the display controller DCTR to a data signal VDATA in the form of an analog voltage, through a digital-to-analog converter (DAC).

During a digital-to-analog conversion, the data driving circuit DDC may convert digital image data DATA to a data signal in the form of an analog voltage based on a plurality of gamma reference voltage GRV.

A plurality of gamma reference voltages are supplied from a gamma circuit GAM. The gamma circuit GAM may be present outside or inside the data driving circuit DDC.

A ground voltage GND may be applied to the display panel DISP. The ground voltage GND may be a DC voltage and may be an AC voltage having a variable voltage level.

In the following, for convenience of description, it will be assumed that the touch panel TSP is embedded in the display panel DISP.

Figure 4:
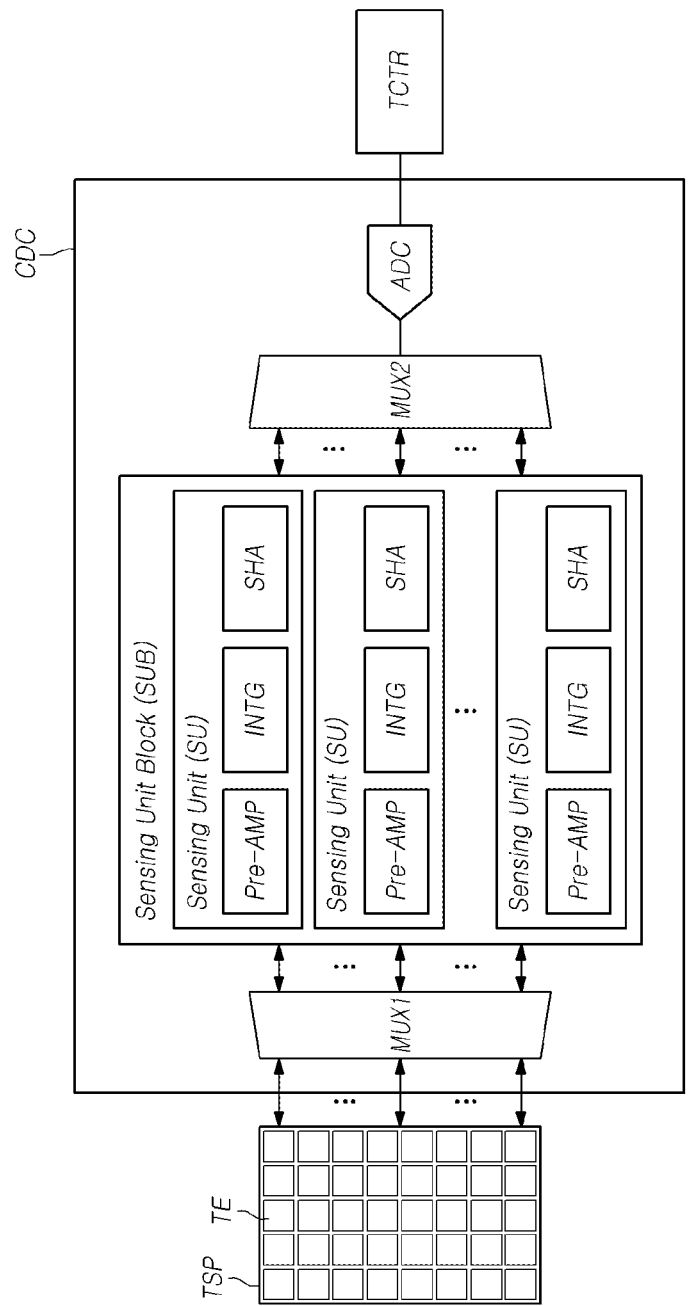
FIGS. 4 and 5 are views illustrating a touch driving circuit of a touch display device according to aspects of the present disclosure.
Figure 5:
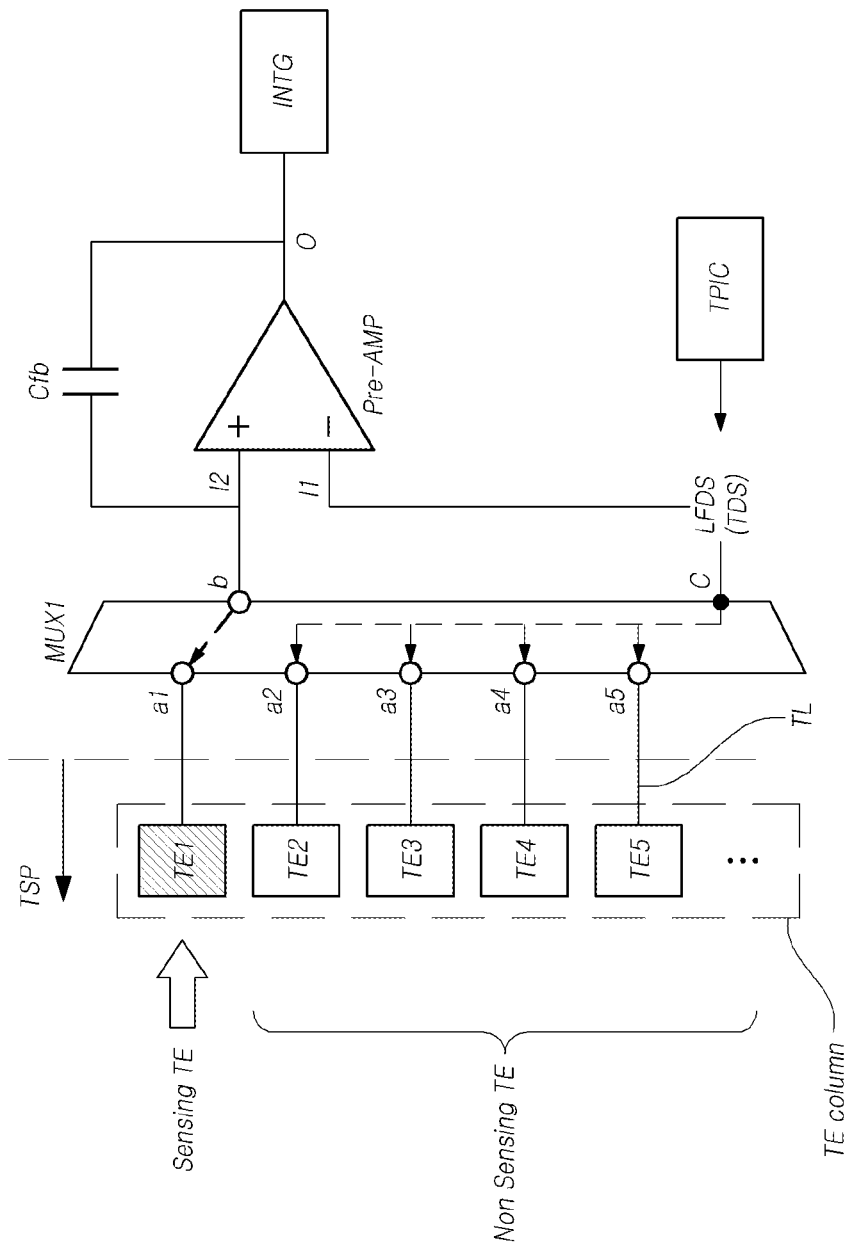

FIG. 4 is a view illustrating a touch driving circuit TDC of a touch display device 100 according to aspects of the present disclosure. FIG. 5 is a view illustrating a touch driving operation for a one touch electrode row performed by a touch driving circuit TDC of a touch display device TDC according to aspects of the present disclosure.

Referring to FIG. 4, the touch driving circuit TDC according to the aspects of the present disclosure may include a first multiplexer circuit MUX1, a sensing unit block SUB including a plurality of sensing units SU, a second multiplexer circuit MUX2, and an analog-to-digital converter ADC.

The first multiplexer circuit MUX 1 may include one or more multiplexers. The second multiplexer circuit MUX 2 may include one or more multiplexers.

Referring to FIG. 4, each sensing unit SU may include a pre-amplifier Pre-AMP, an integrator INTG, and a sample-and-hold circuit SHA.

One pre-amplifier Pre-AMP may be electrically connected to one or more touch electrodes TE.

For example, as illustrated in FIG. 5, one pre-amplifier Pre-AMP may be electrically connected to several touch electrodes TE1, TE2, TE3, TE4, TE5, . . . included in one touch electrode column TE Column.

Referring to FIG. 5, one pre-amplifier Pre-AMP may supply a touch driving signal TDS to, among one or more touch electrodes TE1, TE2, TE3, TE4, TE5, . . . that may be connected, one sensing target touch electrode (e.g., TE1) selected as a sensing target by turns, and may receive and detect a sensing signal from the sensing target touch electrode (e.g., TE1), to which a driving signal TDS is applied.

In more detail, referring to FIG. 5, the first multiplexer circuit MUX1 connects, among several touch electrodes TE1, TE2, TE3, TE4, TE5, . . . included in a touch electrode column, a sensing target touch electrode TE1 that is a touch electrode selected as a sensing target to the pre-amplifier Pre-AMP.

That is, the first multiplexer MUX1 connects node b connected to the pre-amplifier Pre-AMP to node a1 connected to the selected sensing target touch electrode TE1.

Accordingly, the pre-amplifier Pre-AMP receives a touch driving signal TDS output from a touch power circuit TPIC through a first input terminal I1, and outputs the touch driving signal TDS to a second input terminal I2. The first input terminal I1 may be a non-reverse input terminal, and the second input terminal I2 may be a reverse input terminal.

The touch driving signal TDS output from the second input terminal I2 of the pre-amplifier Pre-AMP is supplied to the sensing target touch electrode TE1 selected by the first multiplexer MUX1.

The first multiplexer MUX1 connects nodes a2, a3, a4, a5, . . . connected to, among several touch electrodes TE1, TE2, TE3, TE4, TE5, . . . included in the corresponding touch electrode column, the remaining non-sensing target touch electrodes TE2, TE3, TE4, TE5, . . . except for the sensing target touch electrode TE1 to node C directly connected to the touch power circuit TPIC in common.

Accordingly, among several touch electrodes TE1, TE2, TE3, TE4, TE5, . . . included in the touch electrode column, the non-sensing target touch electrodes TE2, TE3, TE4, TER5, . . . may be supplied with a load free driving signal LFDS corresponding to the touch driving signal TDS while not passing through the pre-amplifier Pre-AMP. The load free driving signal LFDS may be the same signal as the touch driving signal TDS or may be a signal, at least one of the frequency, the phase, and the amplitude of which corresponds to that of the touch driving signal TDS. This will be described again in the following.

Thereafter, the pre-amplifier Pre-AMP may receive a sensing signal from the sensing target touch electrode TE1. A feedback capacitor Cfb is charged by the sensing signal received in this way, and accordingly, the signal output to the output terminal O of the pre-amplifier Pre-AMP may be input to the integrator INTG.

The pre-amplifier Pre-AMP and the integrator INTG may be integrated to be implemented.

The integrator INTG integrates signals output from the pre-amplifier Pre-AMP. As in FIG. 31, the integrator INTG may include an operation amplifier OP-AMP, and a capacitor C connected between a reverse input terminal and an output terminal of the operation amplifier OP-AMP.

The analog-to-digital converter ADC may output, toward the touch controller TCTR, touch sensing data obtained by converting the integration value output to the integrator INTG into a digital value.

The touch controller TCTR may detect whether there is a touch input by a finger and/or a pen, and/or a touch position, based on the touch sensing data.

Figure 6:
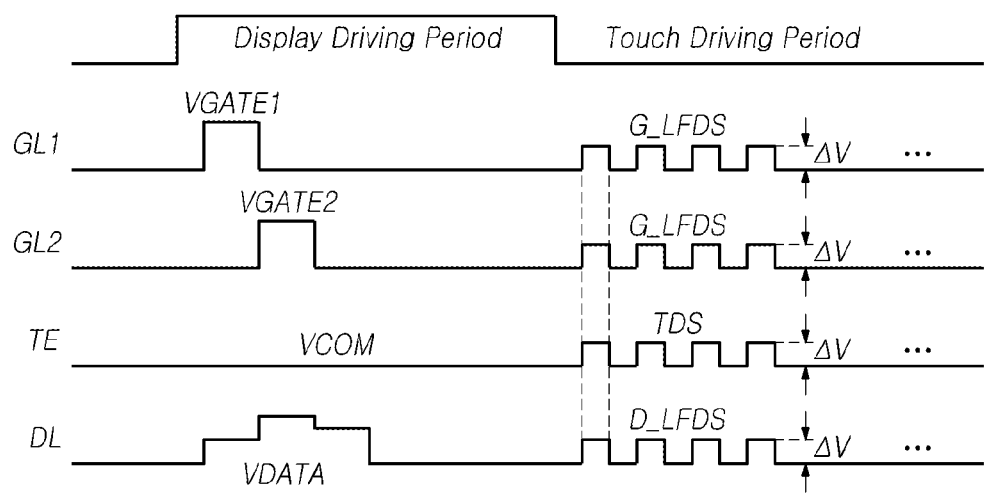
FIG. 6 is a diagram of time division driving timings related to display driving and touch driving of a touch display device according to aspects of the present disclosure.

FIG. 6 is a diagram of time division driving timings related to display driving and touch driving of a touch display device 100 according to aspects of the present disclosure.

Referring to FIG. 6, the touch display device 100 according to the aspects of the present disclosure may perform display driving and touch driving in a time division interval. The driving scheme is called time division driving.

During a display driving period, a common voltage VCOM in the form of a DC voltage is applied to a plurality of touch electrodes TE. Gate signals VGATE1 and VGATE2 having a turn-on level voltage VGH at a scanning time after having a state of a turn-off level voltage VGL may be sequentially applied to a plurality of gate lines GL1 and GL2. Corresponding data signals VDATA may be applied to a plurality of data lines DL.

During a touch driving period after the display driving period, a touch driving signal TDS, the voltage level of which varies over time, may be applied to all or some of the plurality of touch electrodes TE.

During the touch driving period, when a touch driving signal TDS is applied to the touch electrode TE that is a touch sensing target, a signal that is the same as or corresponds to the touch driving signal TDS may be applied to the touch electrode TE that is a non-sensing target disposed in the display panel DISP, the data lines DL, and the gate lines G. This is called load free driving (LFD). The LFD can prevent an unnecessary parasitic capacitance, and can prevent deterioration of touch sensitivity due to the parasitic capacitance.

During the touch driving period, in order to prevent a parasitic capacitance between the touch electrode TE that is a sensing target and another touch electrode TE, an LFD sigal that is the same as or corresponds to the touch driving signal TDS applied to the touch electrode TE that is a sensing target may be applied to all or some of the plurality of touch electrodes TE disposed in the display panel DISP.

During the touch driving period, in order to prevent a parasitic capacitance between the touch electrode TE and the data lines DL, an LFD signal D_LFDS that is the same as or corresponds to the touch driving signal TDS applied to the touch electrode TE that is a sensing target may be applied to all or some of the plurality of data lines DL disposed in the display panel DISP.

During the touch driving period, in order to prevent a parasitic capacitance between the touch electrode TE and the gate lines GL, an LFD signal G_LFDS that is the same as or corresponds to the touch driving signal TDS applied to the touch electrode TE that is a sensing target may be applied to all or some of the plurality of gate lines GL disposed in the display panel DISP.

During the touch driving period, the frequencies and the phases of the LFD signals applied to the touch electrode TE that is a non-sensing target disposed in the display panel DISP, the data lines DL, and the gate lines GL may correspond to the frequency and the phase of the touch driving signal TDS applied to the touch electrode TE that is a sensing target.

During the touch driving period, the amplitudes of the LFD signals applied to the touch electrode TE that is a non-sensing target disposed in the display panel DISP, the data lines DL, and the gate lines GL may correspond to the amplitude of the touch driving signal TDS applied to the touch electrode TE that is a sensing target.

Figure 7:
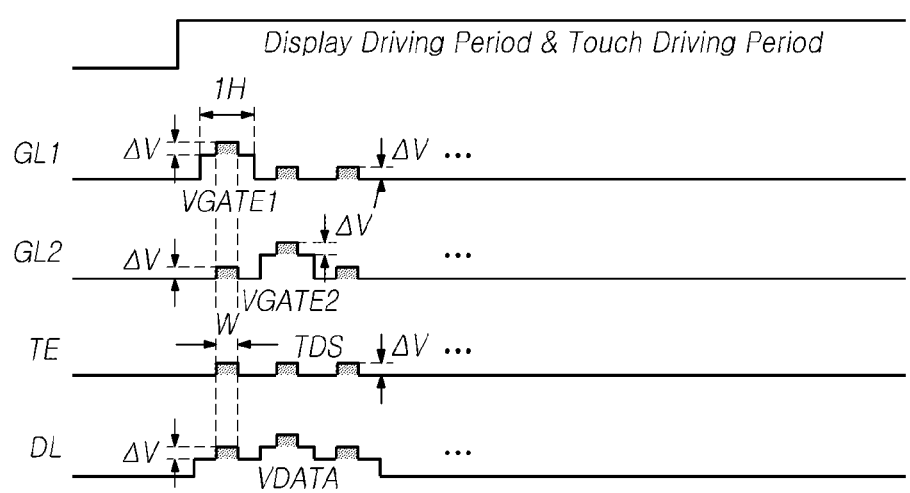
FIGS. 7 and 8 are diagrams of simultaneous driving timings related to display driving and touch driving of a touch display device according to aspects of the present disclosure.
Figure 8:
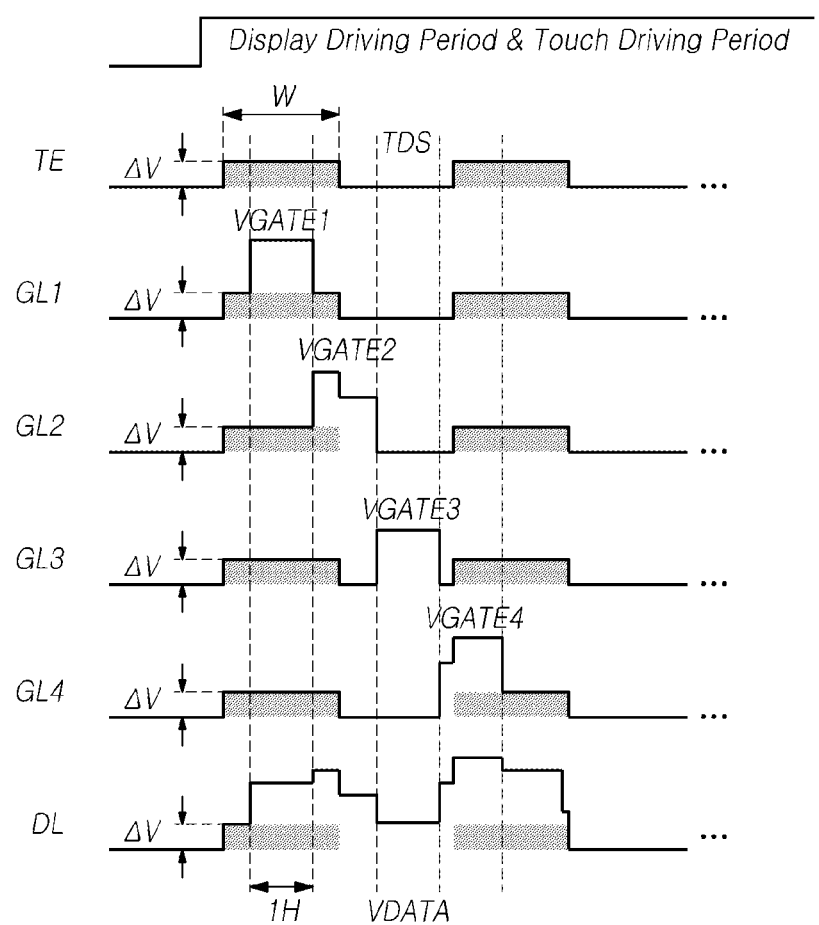

FIGS. 7 and 8 are diagrams of simultaneous driving timings related to display driving and touch driving of a touch display device 100 according to aspects of the present disclosure.

Referring to FIGS. 7 and 8, the touch display device 100 according to the aspects of the present disclosure may simultaneously perform display driving and touch driving. The driving scheme is called simultaneous driving.

Referring to FIGS. 7 and 8, while a data signal VDATA for displaying an image is supplied to the plurality of data lines DL such that the display driving is performed, the touch driving circuit TDC may supply a touch driving signal TDS that swings with a predetermined amplitude $\Delta V$ to the plurality of touch electrodes TE.

The touch driving signal TDS may be a signal, the voltage level of which swings (changes). The touch driving signal TDS is also called a modulation signal, an AC signal, or a pulse signal.

Referring to FIG. 7, the width W of a high level voltage period of the touch driving signal TDS may be shorter than one horizontal period 1H for the display driving.

During a high level voltage period of a data signal VDATA for displaying an image, which is supplied to, among the plurality of data lines DL, at least one data line DL, or during a high level voltage period of a gate signal VGATE1 and VGATE2, which is supplied to, among the plurality of gate lines GL, at least one gate line GL, the voltage level of the touch driving signal TDS may change one or more times.

Referring to FIG. 8, the width W of a high level voltage period of the touch driving signal TDS may be longer than one horizontal period 1H for the display driving.

During the high level voltage period of the touch driving signal TDS, the voltage level of a data signal VDATA for displaying an image supplied to, among the plurality of data lines DL, at least one data line DL may be changed one or more times, or the voltage level of a gate signal VDATA for displaying an image supplied to, among the plurality of gate lines DL, at least one gate line DL may be changed one or more times.

Referring to FIGS. 7 and 8, during the simultaneous driving, a data signal VDATA applied to a data line DL has a form in which an original signal part for displaying an image and the touch driving signal TDS are combined with each other. Accordingly, a point of a voltage change that is the same as the amplitude $\Delta V$ of the touch driving signal TDS may be present in the data signal VDATA.

Referring to FIGS. 7 and 8, during the simultaneous driving, a gate signal VGATE1, VGATE2, VGATE3, and VGATE4 applied to a gate line DL has a form in which an original signal part for driving a gate and the touch driving signal TDS are combined with each other. Accordingly, a point of a voltage change that is the same as the amplitude $\Delta V$ of the touch driving signal TDS may be present in the gate signal VGATE1, VGATE2, VGATE3, and VGATE4.

As described above, because the data signal VDATA has a point of a voltage change that is the same as the amplitude $\Delta V$ of the touch driving signal TDS, by removing a part of the data signal VDATA corresponding to the touch driving signal TDS, the data signal VDTA comes into the same state as the data signal VDATA of the display driving period during the time division driving.

Similarly, because the gate signal VGATE1, VGATE2, VGATE3, and VGATE4 has a point of a voltage change that is the same as the amplitude $\Delta V$ of the touch driving signal TDS, by removing a part of the gate signal VGATE corresponding to the touch driving signal TDS, the gate signal VGATE comes into the same state as the gate signal VGATE of the display driving period during the time division driving.

The feature that the data signal VDATA has a point of the same voltage change as the amplitude $\Delta V$ of the touch driving signal TDS and the gate signal VGATE has a point of the same voltage change as the amplitude $\Delta V$ of the touch driving signal TDS may mean that the data signal VDATA and the gate signal VGATE are modulated with reference to the touch driving signal TDS.

As described above, when signal waveforms of the data signal VDATA and the gate signal VGATE are changed (modulated), the display driving may not be influenced by the touch driving even though the display driving and the touch driving are simultaneously performed during the simultaneous driving.

The feature that the signal waveforms of the data signal VDATA and the gate signal VGATE are changed corresponds to a kind of LFD driving that improves touch sensitivity by preventing an unnecessary parasitic capacitance.

For example, the simultaneous driving may be performed through a modulation technique or a ground modulation technique.

In the case of a gamma modulation technique, the data signal VDATA may be changed by performing digital-to-analog conversion processing by using a gamma reference voltage GRV, the frequency, the phase, and the width ΔV of which correspond to those of the touch driving signal TDS when the data driving circuit DDC is digital-to-analog converted.

The above-described gate signal VGATE may be generated by changing a turn-off level voltage VGL and a turn-on level voltage VGH that are necessary for generating the gate signal such that the frequencies, the phases, and the amplitudes ΔV correspond to those of the touch driving signal TDS.

The ground modulation technique is a scheme in which the ground voltage GND applied to the display panel DISP is a signal having a variable voltage level, and all kinds of signals applied to the display panel DISP are swung with reference to the ground voltage GND by allowing the frequencies and the phases of the signals to correspond to the frequency and the phase of the touch driving signal TDS.

The touch display device 100 according to the aspects of the present disclosure may perform the time division driving at any timing after performing the simultaneous driving.

Figure 9:
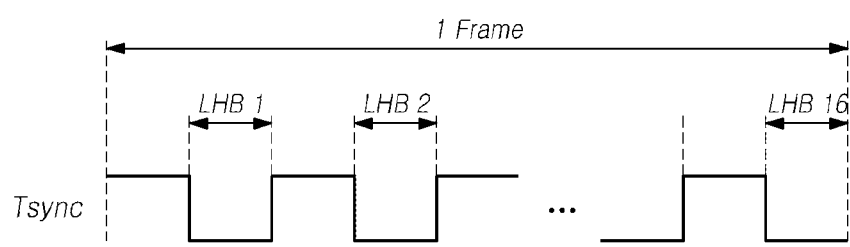
FIG. 9 is a diagram of touch driving timings of a touch display device according to aspects of the present disclosure.

FIG. 9 is a diagram of touch driving timings of a touch display device 100 according to aspects of the present disclosure.

Referring to FIG. 9, the touch display device 100 according to the aspects of the present disclosure may time-divide a frame for sensing all the touch electrodes TE disposed in the touch panel TSP into a plurality of touch intervals LHB 1 to LHB 16, and may sense the touch electrodes TE corresponding to the plurality of touch intervals LHB 1 to LHB 16. In the following, for convenience of description, it will be assumed that one frame period is time-divided into 16 touch intervals LHB 1 to LHB 16.

Referring to FIG. 9, the touch driving circuit TDC may recognize the plurality of touch intervals LHB 1 to LHB 16 through a touch synchronization signal Tsync.

The touch synchronization signal Tsync is a control signal in which touch level intervals defining timings of the plurality of touch intervals LHB 1 to LHB 16 and non-touch level intervals that define non-touch intervals that are not the plurality of touch intervals LHB 1 to LHB 16 are included.

For example, as illustrated in FIG. 9, the touch level intervals may be low level voltage intervals and the non-touch level intervals may be high level voltage intervals. Unlike this, the touch level intervals may be high level voltage intervals and the non-touch level intervals may be low level voltage intervals.

In the time division driving scheme performed while the display driving and the touch driving are time-divided, the non-touch level intervals may be the display driving intervals. In the simultaneous driving scheme in which the display driving and the touch driving are simultaneously performed, the non-touch level intervals may be intermissions between the touch level intervals.

Figure 10:
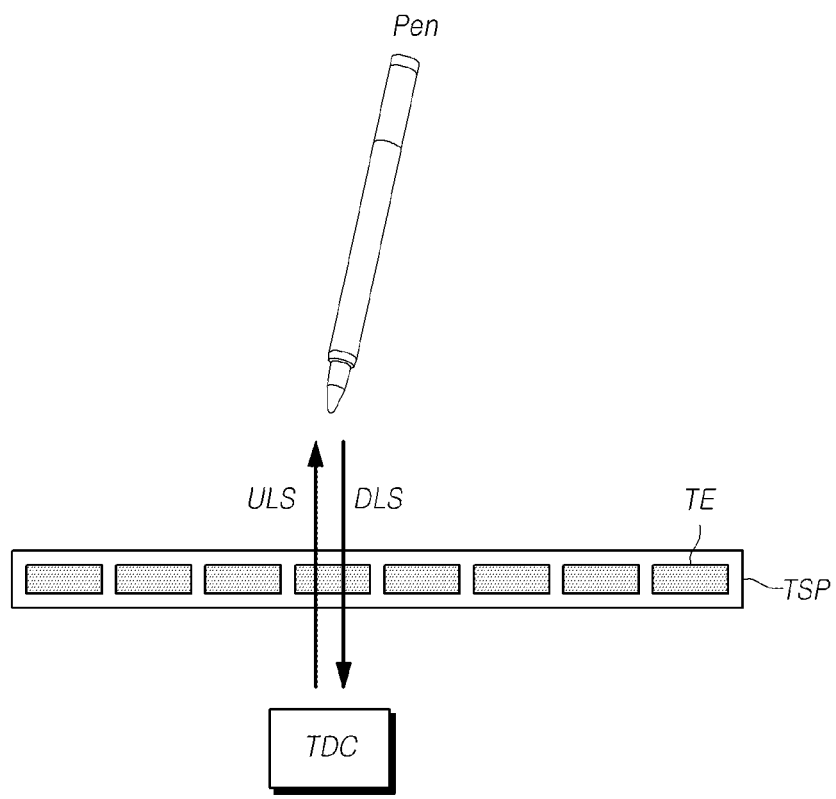
FIG. 10 is a view illustrating bidirectional communication between a pen and a touch driving circuit for pen sensing by a touch display device according to aspects of the present disclosure.

FIG. 10 is a view illustrating bidirectional communication between a pen and a touch driving circuit TDC for pen sensing by a touch display device 100 according to aspects of the present disclosure.

Referring to FIG. 10, the touch display device 100 according to the aspects of the present disclosure may perform bidirectional communication between the pen and the touch driving circuit TDC by the medium of the touch panel TSP for pen sensing.

Referring to FIG. 10, the bidirectional communication may include uplink communication through which the touch driving circuit TDC transmits an uplink signal ULS to the pen through the touch panel TSP, and downlink communication through which the pen transmits a downlink signal DLS to the touch driving circuit through the touch panel TSP.

During the uplink communication, the pen may receive an uplink signal ULS through one or more touch electrodes TE by applying, by the touch driving circuit TDC, an uplink signal ULS to one or more touch electrodes TE disposed in the touch panel TSP.

During the downlink communication, the touch driving circuit TDC may receive a downlink signal DLS through one or more touch electrodes TE by applying, by the pen, a downlink signal DLS to one or more touch electrodes TE disposed in the touch panel TSP.

FIG. 11 is a view illustrating a signal applied to a touch panel TSP and a signal output from a pen during bidirectional communication between the pen and the touch panel TSP, for pen sensing by a touch display device 100 according to aspects of the present disclosure.

Figure 12:
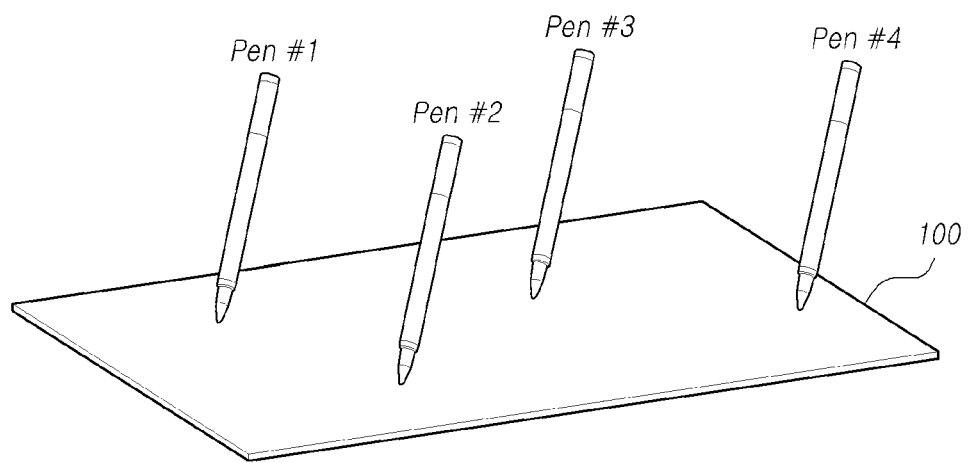
FIG. 12 is a view illustrating multi-pen sensing by a touch display device according to aspects of the present disclosure.

FIG. 12 is a view illustrating multi-pen sensing by a touch display device 100 according to aspects of the present disclosure.

Referring to FIG. 12, the touch display device 100 according to the aspects of the present disclosure may perform both sensing of a touch input by the finger (finger sensing) and sensing of a touch input by the pen (pen sensing).

Accordingly, the plurality of touch intervals LHB 1 to LHB 16 may include one finger sensing interval F and pen sensing intervals. In the specification, the sensing intervals are used as the same meaning as the touch intervals.

Referring to FIG. 11, for example, among the plurality of touch intervals LHB 1 to LHB 16, the pen sensing intervals may include one or more position sensing intervals P for sensing the position of the pen, one or more tilt sensing intervals T for sensing the tilt of the pen, and one or more data sensing intervals D for sensing the data of the pen.

Referring to FIG. 11, for example, among the plurality of touch intervals LHB 1 to LHB 16, the pen sensing intervals may further include one or more beacon transmission intervals B for transmitting a beacon signal BCON for controlling driving of the pen to the pen.

It may be defined as a protocol to which kind of touch interval LHB the plurality of touch intervals LHB 1 to LHB 16 in one frame period is assigned.

According to a modification of the protocol, the plurality of touch intervals LHB 1 to LHB 16 in one frame period may include some of a finger sensing interval F, a beacon transmission interval B, a position sensing interval P, a tilt sensing interval T, and a data sensing interval D. Specially, the plurality of touch intervals LHB 1 to LHB 16 in one frame period may include one or more of a position sensing interval P, a tilt sensing interval T, and a data sensing interval D.

Referring to FIG. 11, during the beacon transmission interval B, the touch driving circuit TDC may apply a beacon signal BCON to all or some of the plurality of touch electrodes TE disposed in the touch panel TSP. Accordingly, the pen may receive a beacon signal BCON applied to the touch panel TSP.

The beacon signal BCON is a kind of an uplink signal ULS, and is a signal for transmitting various pieces of information that define a driving protocol.

The beacon signal BCON may include the same information during every transmission, and may include different pieces of information.

The beacon signal BCON, for example, may include touch panel information (may be display panel information when the touch panel TSP is embedded in the display panel DISP) such as touch panel identification information and touch panel type information (e.g., an in-cell type), and may include touch interval LHB information, multiplexer driving information, power mode information (e.g., LHB information that does not drive the panel and the pen for saving power consumption), and error check information.

The beacon signal BCON may include information for driving timing synchronization between the touch panel TSP and the pen.

The beacon signal BCON may include identification information ID of the pen used during the communication with the touch driving circuit TDC. The identification information ID of the pen may be identification information given to the pen by the pen manufacturer, and may be identification information temporarily given to the pen during a period in which communication may be made between the pen and the touch display device 100 after the touch display device 100 discovers the pen.

The beacon signal BCON may include a pen signal PENS output by the pen and/or frequency information of data.

The beacon signal BCON may include information on a pen signal PENS output by the pen and/or a signal format (a pulse state and a pulse format) of data.

Various pieces of information included in the above-described beacon signal BCON may be stored in a lookup table of the touch display device 100, and an update history may be transmitted to the pen during updating. The lookup table may be shared with the pen in advance.

Referring to FIG. 11, during the position sensing interval P and the tilt sensing interval T, the touch driving circuit TDC may apply a DC voltage to all or some of the plurality of touch electrodes TE disposed in the touch panel TSP. During the position sensing interval P and the tilt sensing interval T, the DC voltage applied to the touch electrodes TE may be regarded as a kind of an uplink signal ULS.

Unlike this, during the position sensing interval P and the tilt sensing interval T, the touch driving circuit TDC may apply a modulation signal (also called an AC signal or a pulse signal) having a variable voltage level to all or some of the plurality of touch electrodes TE disposed in the touch panel TSP. During the position sensing interval P and the tilt sensing interval T, the modulation signal applied to the touch electrodes TE may be regarded as a kind of an uplink signal ULS.

Referring to FIG. 11, during the position sensing interval P and the tilt sensing interval T, the pen outputs a pen signal PENS if the touch driving circuit TDC applies a DC voltage (or a modulation signal) to the touch panel TSP.

The pen signal PENS output from the pen is a kind of a downlink signal DLS, and may be applied to one or more touch electrodes TE disposed in the touch panel TSP.

The touch driving circuit TDC may receive a pen signal PENS output from the pen and applied to the touch panel TSP through one or more touch electrodes TE.

Referring to FIG. 11, during the data sensing interval D, the touch driving circuit TDC may apply a DC voltage to all or some of the plurality of touch electrodes TE disposed in the touch panel TSP. During the data sensing interval D, the DC voltage applied to the touch electrodes TE may be regarded as a kind of an uplink signal ULS.

Unlike this, during the position sensing interval P and the tilt sensing interval T, the touch driving circuit TDC may apply a modulation signal (also called an AC signal or a pulse signal) having a variable voltage level to all or some of the plurality of touch electrodes TE disposed in the touch panel TSP. During the data sensing interval D, the modulation signal applied to the touch electrodes TE may be regarded as a kind of an uplink signal ULS.

Referring to FIG. 11, during the data sensing interval D, the pen outputs data DATA if the touch driving circuit TDC applies a DC voltage (or a modulation signal) to the touch panel TSP.

The data output from the pen may include various pieces of additional information of the pen as a kind of a downlink signal DLS. The various pieces of additional information of the pen, for example, may include one or more of pressure information (writing pressure information) and button input information, and may include identification information ID of the pen, of which the pen informs the touch display device 100.

The touch driving circuit TDC may receive data DATA output from the pen and applied to the touch panel TSP through one or more touch electrodes TE.

Referring to FIG. 11, during the finger sensing interval F, a touch driving signal TDS in the form of a modulation signal (also called an AC signal or a pulse signal), the voltage level of which varies, may be applied to all or some of the plurality of touch electrodes TE disposed in the touch panel TSP.

Referring to FIG. 11, during the finger sensing interval F, when there is a pen, a pen signal PENS may be output from the pen and be applied to the touch panel TSP.

As described above, the touch display device 100 according to the aspects of the present disclosure has a considerable difficulty in sensing two or more pens for the reason of difficulty of identification of the pens and lack of time assigned to the sensing intervals because the plurality of touch intervals LHB 1 to LHB 16 in one frame period have to be assigned to various sensing intervals F, B, P, T, and D.

In the following, an efficient multi-pen sensing method will be described.

Figure 13:
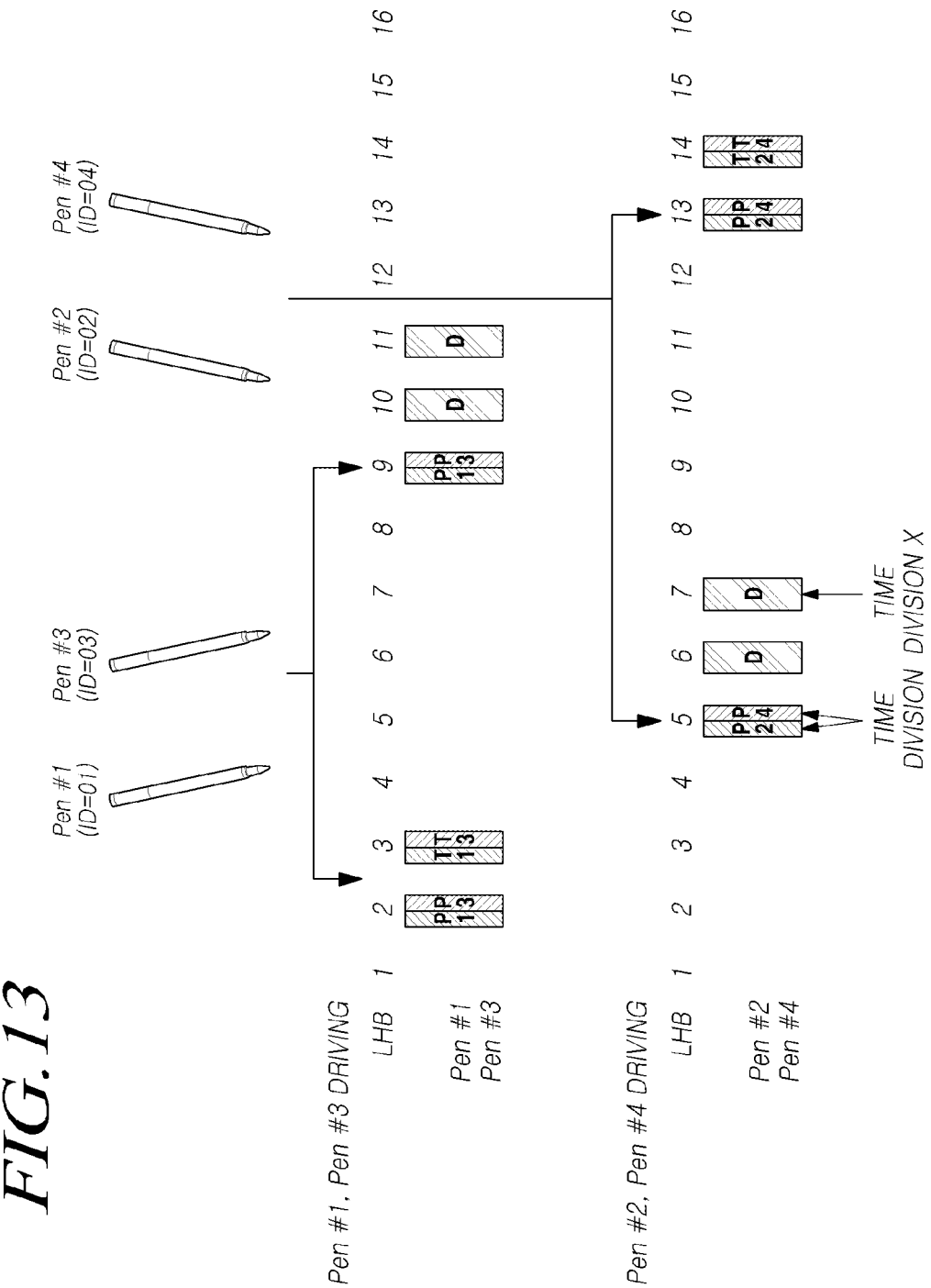
Figure 14:
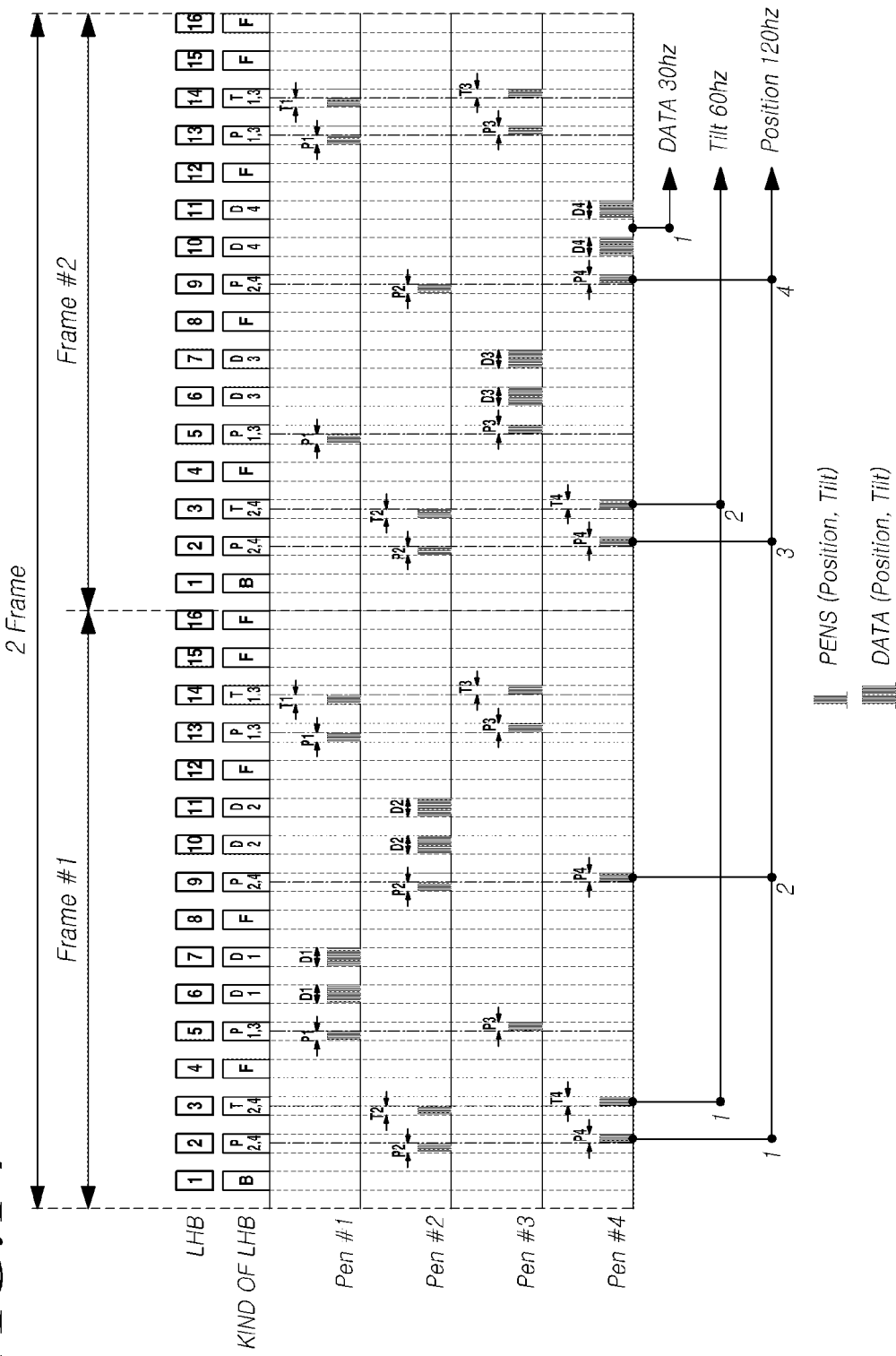

FIGS. 13 to 15 are views illustrating a time division driving scheme for multi-pen sensing by a touch display device 100 according to aspects of the present disclosure.

Referring to FIG. 13, in order to sense the positions and the tilts of two or more pens Pen #1, Pen #2, Pen #3, and Pen #4, the touch display device 100 according to the aspects of the present disclosure may be driven in a scheme in which one touch interval (e.g., LHB 2, LHB 3, LHB9, LHB 5, LHB 13, and LHB 14) is time-divided into two or more small invervals (e.g., P1, P3, T1, T3, P2, P4, T2, and T4, hereinafter also called 'time division sensing intervals'), and two or more pens Pen #1, Pen #2, Pen #3, and Pen #4 are assigned to the above time division sensing intervals (e.g., P1, P3, T1, T3, P2, P4, T2, and T4), respectively.

In order to sense data of two or more pens Pen #1, Pen #2, Pen #3, and Pen #4, the touch display device 100 according to the aspects of the present disclosure may sense data of a pen according to a predetermined sequence during a data sensing interval D while not time-dividing the data sensing interval D corresponding to one touch interval.

In the following, for convenience of description, it will be assumed that four pens Pen #1, Pen #2, Pen #3, and Pen #4 are provided. Hereinafter, in the drawings, in 'P(number)', the number corresponds to the number of a pen and P means a position sensing interval. For example, P1 means a sensing interval (a touch interval) for sensing the position of a first pen Pen #1, and P3 means a sensing interval (a touch interval) for sensing the position of a third pen Pen #3. Similarly, in the drawings, in 'T(number)', the number corresponds to the number of a pen and T means a tilt sensing interval. For example, T1 means a sensing interval (a touch interval) for sensing the tilt of a first pen Pen #1, and T3 means a sensing interval (a touch interval) for sensing the tilt of a third pen Pen #3. Similarly, in the drawings, in 'D(number)', the number corresponds to the number of a pen and D means a data sensing interval. For example, D1 means a sensing interval (a touch interval) for sensing the data of a first pen Pen #1, and D3 means a sensing interval (a touch interval) for sensing the data of a third pen Pen #3.

Referring to FIGS. 13 and 14, it will be assumed that respective identification information ID of four pens Pen #1, Pen #2, Pen #3, and Pen #4 is 01, 02, 03, and 04. FIGS. 13 and 14 may correspond to a case in which the first pen Pen #1, the second pen Pen #2, the third pen Pen #3, and the fourth pen Pen #4 are sequentially discovered.

The details will be described with reference to FIG. 14. The assignment of the touch interval of FIG. 14 may be slightly different from the assignment of the touch interval of FIG. 13. However, the assignment of the touch intervals is simply exemplary.

The operation period of the touch driving circuit TDC may include a plurality of touch intervals LHB 1 to LHB 16.

The plurality of touch intervals LHB 1 to LHB 16 may include a first position sensing interval P1,3 and a second position sensing interval P2,4.

The first position sensing interval P1,3 may include a first time division position sensing interval P1 and a third time division position sensing interval P3. In the example of FIG. 14, the first position sensing interval P1,3 corresponds to LHB 5 and LHB 13 in the first and second frames, respectively.

The second position sensing interval P2,4 may include a second time division sensing interval P2 and a fourth time division position sensing interval P4. In the example of FIG. 14, the second position sensing interval P2,4 corresponds to LHB 2 and LHB 9 in the first and second frames, respectively.

During the first time division position sensing interval P1 obtained by time-dividing the first position sensing interval P1,3, the touch driving circuit TDC may detect a pen signal PENS output from the first pen Pen #1 through the touch panel TSP. The position (location) of the first pen Pen #1 may be sensed from the detection result.

During the second time division position sensing interval P2 obtained by time-dividing the second position sensing interval P2,4, the touch driving circuit TDC may detect a pen signal output from the second pen Pen #2, which is different from the first pen Pen #1, through the touch panel TSP. The position (location) of the second pen Pen #2 may be sensed from the detection result.

When the third pen PEN #3 is further discovered, during a third time division position sensing interval P3 obtained by time-dividing the first position sensing interval P1,3, the touch driving circuit TDC may detect a pen signal PENS output from the third pen Pen #3 through the touch panel TSP. The position (location) of the third pen Pen #3 may be sensed from the detection result.

When the fourth pen PEN #4 is further discovered, during a fourth time division position sensing interval P4 obtained by time-dividing the second position sensing interval P2,4, the touch driving circuit TDC may detect a pen signal PENS output from the fourth pen Pen #4 through the touch panel TSP. The position (location) of the fourth pen Pen #4 may be sensed from the detection result.

Referring to FIG. 14, the plurality of touch intervals LHB 1 to LHB 16 may include a first tilt sensing interval T1,3 and a second tilt sensing interval T2,4.

The first tilt sensing interval T1,3 may include a first time division tilt sensing interval T1 and a third time division tilt sensing interval T3. In the example of FIG. 14, the first tilt sensing interval T1,3 corresponds to LHB 14 in the first and second frames, respectively.

The second tilt sensing interval T2,4 may include a second time division tilt sensing interval T2 and a fourth time division tilt sensing interval T4. In the example of FIG. 14, the second tilt sensing interval T2,4 corresponds to LHB 3 in the first and second frames, respectively.

During the first time division tilt sensing interval T1 obtained by time-dividing the first tilt sensing interval T1,3, the touch driving circuit TDC may detect a pen signal PENS output from the first pen Pen #1 through the touch panel TSP. The tilt (inclination) of the first pen Pen #1 may be sensed from the detection result.

During the second time division tilt sensing interval T2 obtained by time-dividing the second tilt sensing interval T2,4, the touch driving circuit TDC may detect a pen signal PENS output from the second pen Pen #2, which is different from the first pen Pen #1, through the touch panel TSP. The tilt (inclination) of the second pen Pen #2 may be sensed from the detection result.

When the third pen PEN #3 is further discovered, during a third time division tilt sensing interval T3 obtained by time-dividing the first tilt sensing interval T1,3, the touch driving circuit TDC may detect a pen signal PENS output from the third pen Pen #3 through the touch panel TSP. The tilt (inclination) of the third pen Pen #3 may be sensed from the detection result.

When the fourth pen PEN #4 is further discovered, during a fourth time division tilt sensing interval T4 obtained by time-dividing the second tilt sensing interval P2,4, the touch driving circuit TDC may detect a pen signal PENS output from the fourth pen Pen #4 through the touch panel TSP. The tilt (inclination) of the fourth pen Pen #4 may be sensed from the detection result.

Referring to FIGS. 14 and 15, the plurality of touch intervals LHB 1 to LHB 16 in a first frame period Frame #1 may further include a first data sensing interval D1 and a second data sensing interval D2. In the example of FIG. 14, the first data sensing interval D1 corresponds to LHB 6 and LHB 7 in the first frame period Frame #1. The second data sensing interval D2 corresponds to LHB 10 and LHB 11 in the first frame period Frame #1.

Referring to FIGS. 14 and 15, the plurality of touch intervals LHB 1 to LHB 16 in a second frame period Frame #2 may further include a third data sensing interval D3 and a fourth data sensing interval D4. In the example of FIG. 14, the third data sensing interval D3 corresponds to LHB 6 and LHB 7 in the second frame period Frame #2. The fourth data sensing interval D4 corresponds to LHB 10 and LHB 11 in the second frame period Frame #2.

During the first data sensing interval D1, the touch driving circuit TDC detects data output from the first pen Pen #1 through the touch panel TSP. Various pieces of additional information of the first pen Pen #1 may be sensed from the detection result. The data output from the first pen Pen #1 may include a pen ID of the first pen Pen #1. The pen ID of the first pen Pen #1 may be a unique ID of the first pen Pen

1 given to the first pen Pen #1 by the pen manufacturer or may be a temporary ID temporarily assigned (given) to the first pen Pen #1.

During the second data sensing interval D2, the touch driving circuit TDC detects data output from the second pen Pen #2 through the touch panel TSP. Various pieces of additional information of the second pen Pen #2 may be sensed from the detection result. The data output from the second pen Pen #2 may include a pen ID of the second pen Pen #2. The pen ID of the second pen Pen #2 may be a unique ID UID of the second pen Pen #2 given to the second pen Pen #2 by the pen manufacturer or may be a temporary ID temporarily assigned (given) to the second pen Pen #2.

When the third pen Pen #3 is further discovered, the touch driving circuit TDC detects data output from the third pen Pen #3 through the touch panel TSP during the third data sensing interval D3. Various pieces of additional information of the third pen Pen #3 may be sensed from the detection result.

When the fourth pen Pen #4 is further discovered, the touch driving circuit TDC detects data output from the fourth pen Pen #4 through the touch panel TSP during the fourth data sensing interval D4. Various pieces of additional information of the fourth pen Pen #4 may be sensed from the detection result.

Although position sensing interval(s), tilt sensing interval(s), and data sensing interval(s) are included in one frame period in FIG. 14, one or more of position sensing interval(s), tilt sensing interval(s), and data sensing interval(s) may be included in one frame period.

Referring to FIG. 14, the temporal lengths of the first to fourth time division position sensing intervals P1, P2, P3, and P4 and the temporal lengths of the first to fourth tilt position sensing intervals T1, T2, T3, and T4 are the same.

The temporal lengths of the first to fourth time division position sensing intervals P1, P2, P3, and P4 may be shorter than the temporal lengths of the first to fourth data sensing intervals D1, D2, D3, and D4. The temporal lengths of the first to fourth tilt position sensing intervals T1, T2, t3, and T4 may be shorter than the temporal lengths of the first to fourth data sensing intervals D1, D2, D3, and D4.

Referring to FIG. 14, for example, the position for one pen are sensed four times during two frame periods, the tilt for one pen is sensed two times, and data (additional information) for one pen is sensed one time.

Accordingly, for example, the ratio of the sensing speeds (or also called a report rate) for the position, the sensing speed for the tilt, and the sensing speed for the data may be 4:2:1. As an example, the sensing speed (or also called a report rate) for the position may be 120 Hz, the sensing speed for the tilt may be 60 Hz, and the sensing speed for the data may be 30 Hz.

During the first time division position sensing interval P1 obtained by time-dividing the first position sensing interval P1,3, the touch driving circuit TDC may detect a signal through a first touch electrode group (an aggregate of the touch electrodes TE sensed during the first time division position sensing interval P1) of the touch panel TSP. During the third time division position sensing interval P3 obtained by time-dividing the first position sensing interval P1,3, the touch driving circuit TDC may detect a signal through a second touch electrode group (an aggregate of the touch electrodes TE sensed during the third time division position sensing interval P3) of the touch panel TSP. The first touch electrode group and the second touch electrode group may be the same or may be different.

During the second time division position sensing interval P2 obtained by time-dividing the second position sensing interval P2,4, the touch driving circuit TDC may detect a signal through the first touch electrode group (an aggregate of the touch electrodes TE sensed during the second time division position sensing interval P2) of the touch panel TSP. During the fourth time division position sensing interval P4 obtained by time-dividing the second position sensing interval P2,4, the touch driving circuit TDC may detect a signal through the second touch electrode group (an aggregate of the touch electrodes TE sensed during the fourth time division position sensing interval P4) of the touch panel TSP. The first touch electrode group and the second touch electrode group may be the same or may be different.

FIGS. 16 to 20 are views illustrating a time division/multi-frequency driving scheme for multi-pen sensing by a touch display device 100 according to aspects of the present disclosure.

Figure 16:
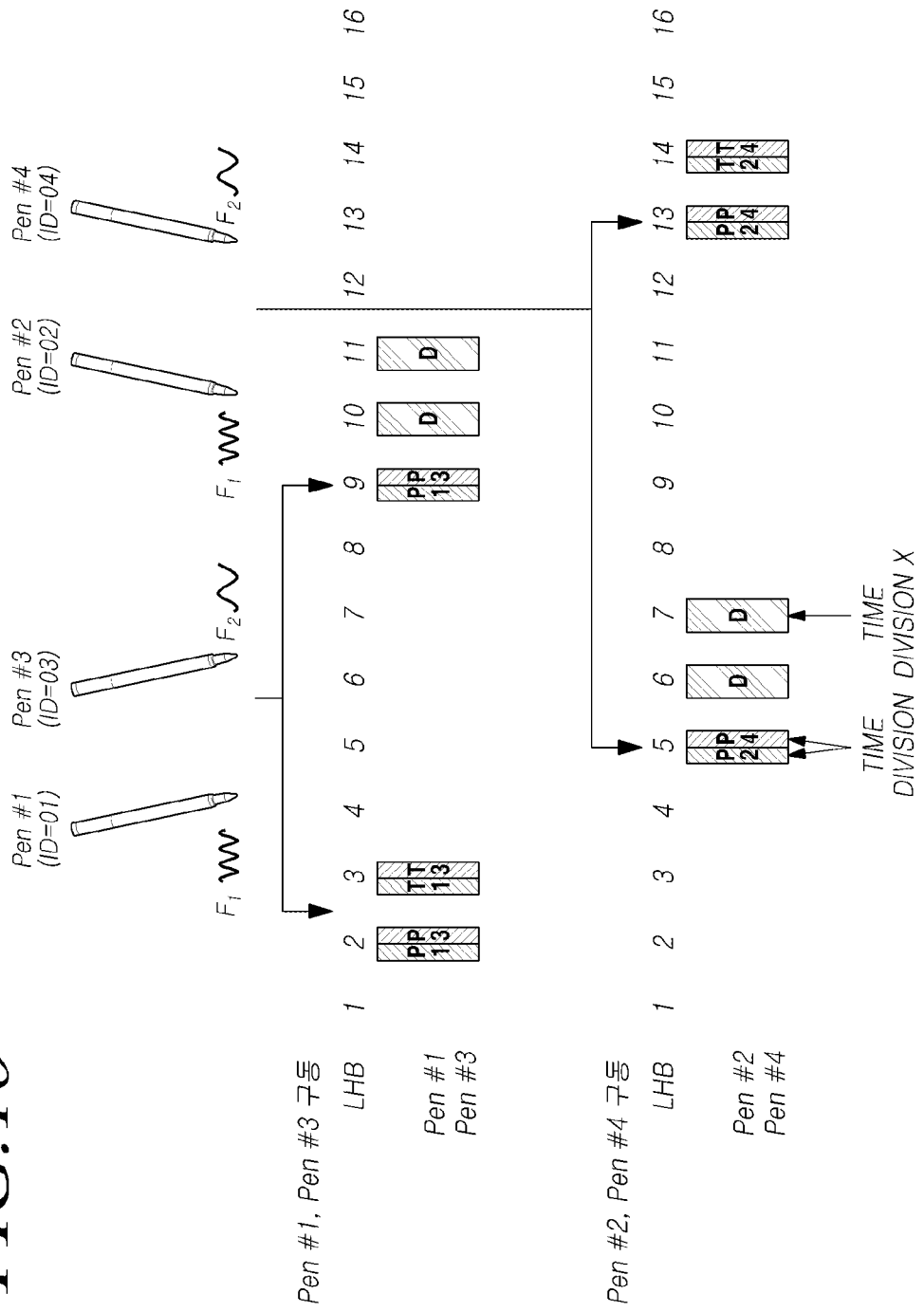

Referring to FIG. 16, the touch display device 100 according to the aspects of the present disclosure may be driven in a scheme in which one touch interval (e.g., LHB 2, LHB 3, LHB9, LHB 5, LHB 13, and LHB 14) is time-divided into two or more small intervals (e.g., P1, P3, T1, T3, P2, P4, T2, and T4, hereinafter also called 'time division sensing intervals'), and two or more pens Pen #1, Pen #2, Pen #3, and Pen #4 are assigned to the above time division sensing intervals (e.g., P1, P3, T1, T3, P2, P4, T2, and T4), respectively.

In order to sense data of two or more pens Pen #1, Pen #2, Pen #3, and Pen #4, the touch display device 100 according to the aspects of the present disclosure may sense data of a pen according to a predetermined sequence during a data sensing interval D while not time-dividing the data sensing interval D corresponding to one touch interval.

Referring to FIG. 16, the plurality of pens Pen #1, Pen #2, Pen #3, Pen #4, . . . may output a pen signal PENS and data DATA having, among two or more usable signal frequencies SF, assigned signal frequencies F1 and F2.

The touch driving circuit TDC may detect data at the operation frequencies OF assigned during the touch intervals LHB 10, LHB 11, LHB 6, and LHB 7 corresponding to the data sensing intervals D1, D2, D3, and D4.

However, the touch driving circuit TDC does not detect data at one operation frequency OF assigned during the position sensing interval and the tilt sensing intervals.

The touch driving circuit TDC may detect a signal for sensing the position at the operation frequencies OF assigned during the first and third time division position sensing intervals P1 and P3 obtained by time-dividing the first position sensing interval P1,3. The touch driving circuit TDC may detect a signal for sensing the position at the operation frequencies OF assigned during the second and fourth time division position sensing intervals P2 and P4 obtained by time-dividing the second position sensing interval P2,4.

The touch driving circuit TDC may detect a signal for sensing the position at the operation frequencies OF assigned during the first and third time division tilt sensing intervals T1 and T3 obtained by time-dividing the first tilt sensing interval P1,3. The touch driving circuit TDC may detect a signal for sensing the position at the operation frequencies OF assigned during the second and fourth time division tilt sensing intervals T2 and T4 obtained by time-dividing the second tilt sensing interval P2,4.

The details will be described with reference to FIGS. 17 to 19.

Figure 17:
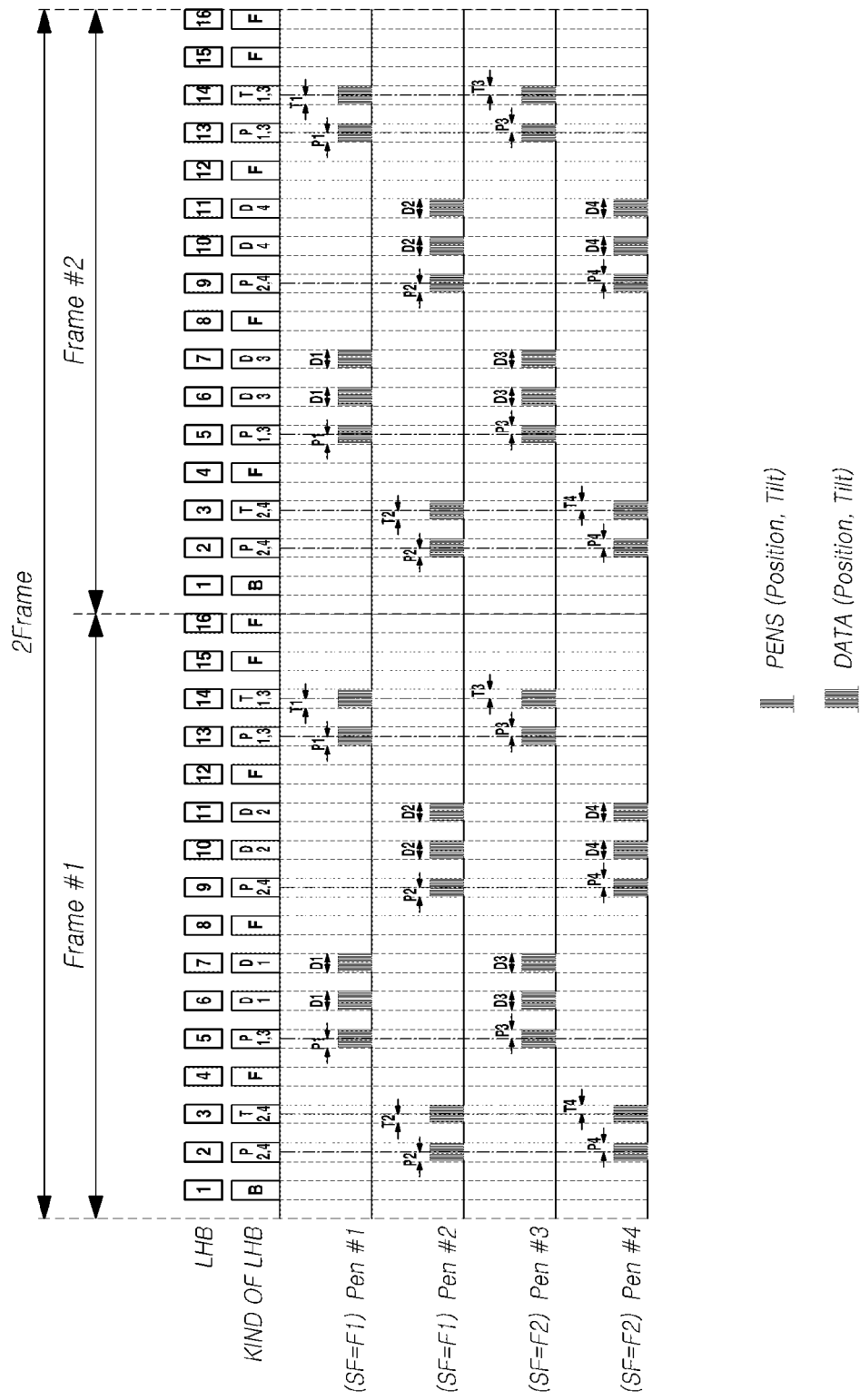

Referring to FIG. 17, the first pen Pen #1 and the second pen Pen #2 output a pen signal PENS and data DATA by using a first signal frequency F1 as a signal frequency SF.

Referring to FIG. 17, the third pen Pen #3 and the fourth pen Pen #4 output a pen signal PENS and data DATA by using a second signal frequency F2 as a signal frequency SF. The second signal frequency F2 is a frequency that is different from the first signal frequency F1.

The touch driving circuit TDC detects a signal according to a timing of one of the first operation frequency F1 and the second operation frequency F2 as the operation frequency OF.

The first signal frequency F1 is the same as the first operation frequency F1. The second signal frequency F2 is the same as the second operation frequency F2.

The touch driving circuit TDC may detect a pen signal PENS having the same signal frequency SF as the operation frequency OF.

The pen signal PENS having a signal frequency SF that is different from the operation frequency OF of the touch driving circuit TDC may not be received by the touch driving circuit TDC or may not normally detected by the touch driving circuit TDC even though it is received by the touch driving circuit TDC.

Figure 18:
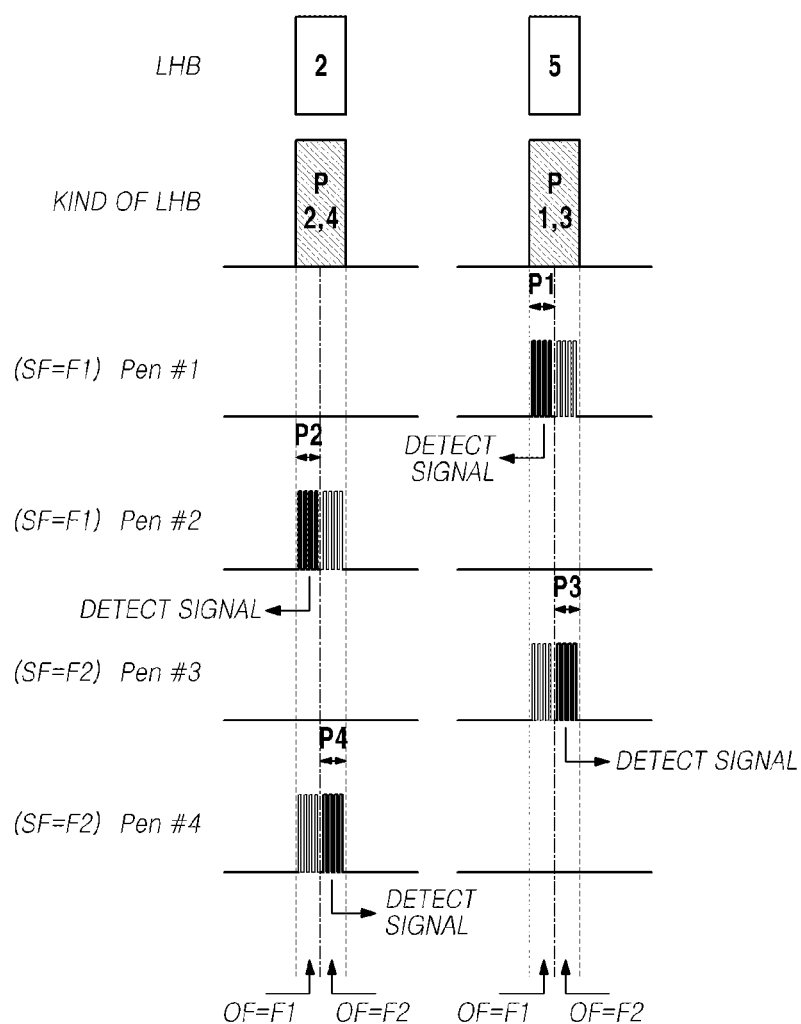

Referring to FIGS. 17 and 18, the touch driving circuit TDC detects a signal at the first operation frequency F1 during the first time division position sensing interval P1 obtained by time-dividing the first position sensing interval P1,3, and detects a signal at the second operation frequency F2 that is different from the first operation frequency F1 during the third time division position sensing interval P3 obtained by time-dividing the first position sensing interval P1,3.

During the first position sensing interval P1,3, the first pen Pen #1 outputs a pen signal PENS having the first signal frequency F1, and the third pen Pen #3 outputs a pen signal PENS having the second signal frequency F2.

Because the touch driving circuit TDC may detect a pen signal PENS having the same signal frequency SF as the operation frequency OF, it may detect a pen signal PENS output from the first pen Pen #1 and having the first signal frequency F1 through the touch panel TSP during the first time division position sensing interval P1, and may detect a pen signal PENS output from the third pen Pen #3 and having the second signal frequency F2 through the touch panel TSP during the third time division position sensing interval P3.

Referring to FIGS. 17 and 18, the touch driving circuit TDC detects a signal at the first operation frequency F1 during the second time division position sensing interval P2 obtained by time-dividing the second position sensing interval P2,4, and detects a signal at the second operation frequency F2 during the fourth time division position sensing interval P4 obtained by time-dividing the second position sensing interval P2,4.

During the second position sensing interval P2,4, the second pen Pen #2 outputs a pen signal PENS having the first signal frequency F1, and the fourth pen Pen #4 outputs a pen signal PENS having the second signal frequency F2.

Because the touch driving circuit TDC may detect a pen signal PENS having the same signal frequency SF as the operation frequency OF, it may detect a pen signal PENS output from the second pen Pen #2 and having the first signal frequency F1 through the touch panel TSP during the second time division position sensing interval P2, and may detect a pen signal PENS output from the fourth pen Pen #4 and having the second signal frequency F2 through the touch panel TSP during the fourth time division position sensing interval P4.

Referring to FIGS. 17 and 18, the touch driving circuit TDC detects a signal at the first operation frequency F1 during the first time division tilt sensing interval T1 obtained by time-dividing the first tilt sensing interval T1,3, and detects a signal at the second operation frequency F2 that is different from the first operation frequency F1 during the third time division tilt sensing interval T3 obtained by time-dividing the first tilt sensing interval T1,3.

During the first tilt sensing interval T1,3, the first pen Pen #1 outputs a pen signal PENS having the first signal frequency F1, and the third pen Pen #3 outputs a pen signal PENS having the second signal frequency F2.

Because the touch driving circuit TDC may detect a pen signal PENS having the same signal frequency SF as the operation frequency OF, it may detect a pen signal PENS output from the first pen Pen #1 and having the first signal frequency F1 through the touch panel TSP during the first time division tilt sensing interval T1, and may detect a pen signal PENS output from the third pen Pen #3 and having the second signal frequency F2 through the touch panel TSP during the third time division tilt sensing interval T3.

Referring to FIGS. 17 and 18, the touch driving circuit TDC detects a signal at the first operation frequency F1 during the second time division tilt sensing interval T2 obtained by time-dividing the second tilt sensing interval T2,4, and detects a signal at the second operation frequency F2 during the fourth time division tilt sensing interval T4 obtained by time-dividing the second tilt sensing interval T2,4.

During the second tilt sensing interval T2,4, the second pen Pen #2 outputs a pen signal PENS having the first signal frequency F1, and the fourth pen Pen #4 outputs a pen signal PENS having the second signal frequency F2.

Because the touch driving circuit TDC may detect a pen signal PENS having the same signal frequency SF as the operation frequency OF, it may detect a pen signal PENS output from the second pen Pen #2 and having the first signal frequency F1 through the touch panel TSP during the second time division tilt sensing interval T2, and may detect a pen signal PENS output from the fourth pen Pen #4 and having the second signal frequency F2 through the touch panel TSP during the fourth time division tilt sensing interval T4.

As described above, during the position and tilt sensing, the touch driving circuit TDC detects a signal while changing the operation frequencies in the first frame period Frame #1 and the second frame period Frame #2, respectively.

However, the touch driving circuit TDC performs an operation of detecting a signal at the first operation frequency F1 during the first frame period Frame #1 and performs an operation of detecting a signal at the second operation frequency F2 during the second frame period Frame #2.

Figure 19:
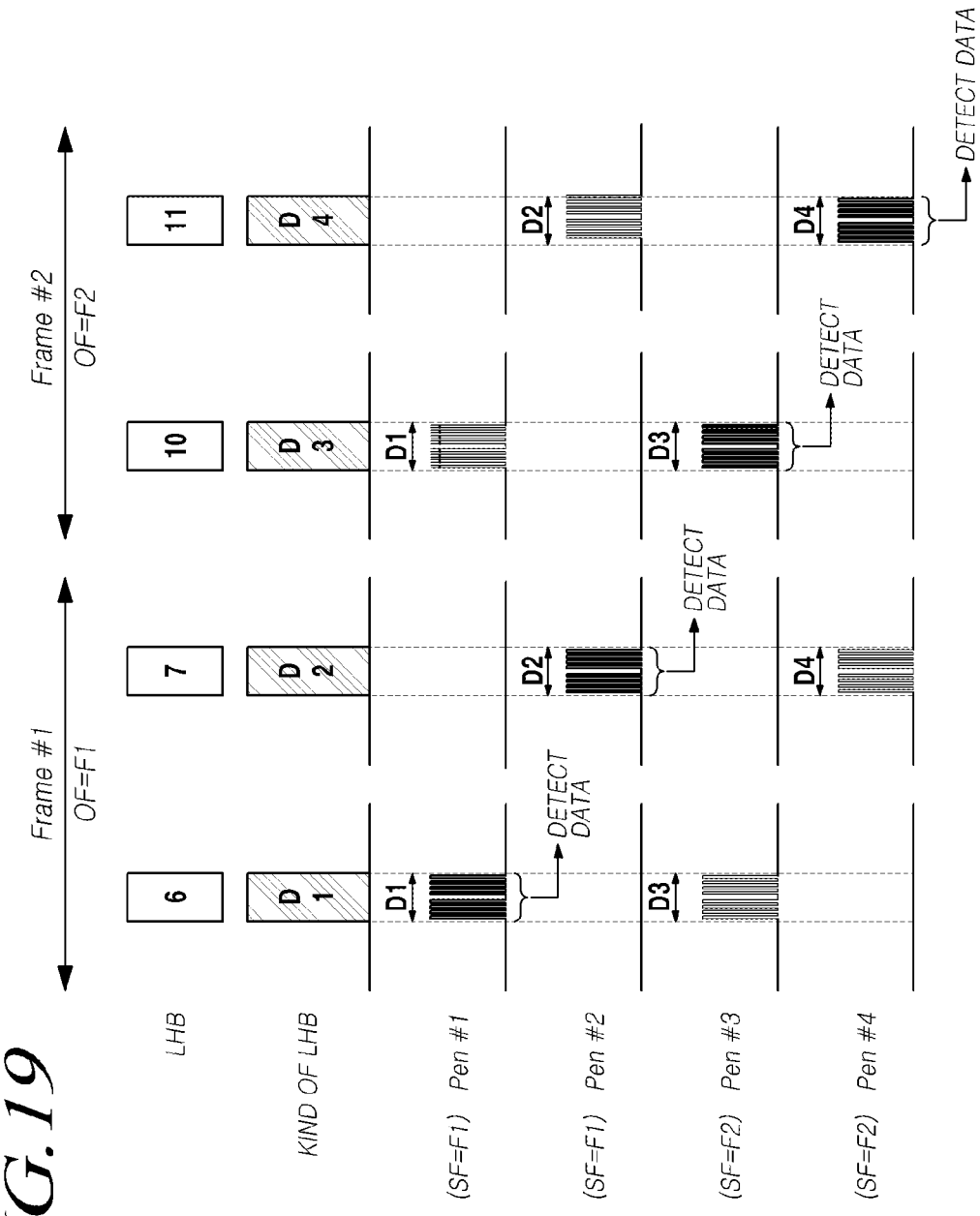

Referring to FIGS. 17, 19, and 20, the touch driving circuit TDC detects data at the first operation frequency F1 during a first data sensing interval D1 corresponding to LHB 6 and LHB 7 in the first frame period Frame #1, and detects data DATA output from the first pen Pen #1 and having the first signal frequency F1 that is the same as the first operation frequency F1, through the touch panel TSP.

However, because the touch driving circuit TDC detects data at the first operation frequency F1 during a first data sensing interval D1 corresponding to LHB 6 and LHB 7 in the first frame period Frame #1, and does not detect data DATA output from the second pen Pen #2 and having the second signal frequency F1 that is different from the first operation frequency F1, through the touch panel TSP.

Referring to FIGS. 17, 19, and 20, the touch driving circuit TDC detects data at the first operation frequency F1 during a second data sensing interval D2 corresponding to LHB 10 and LHB 11 in the first frame period Frame #1, and detects data DATA output from the second pen Pen #1 and having the first signal frequency F1 that is the same as the first operation frequency F1, through the touch panel TSP.

However, because the touch driving circuit TDC detects data at the first operation frequency F1 during a second data sensing interval D2 corresponding to LHB 10 and LHB 11 in the first frame period Frame #1, and does not detect data DATA output from the fourth pen Pen #4 and having the second signal frequency F2 that is different from the first operation frequency F1, through the touch panel TSP.

Referring to FIGS. 17, 19, and 20, the touch driving circuit TDC detects data at the second operation frequency F2 during a third data sensing interval D3 corresponding to LHB 6 and LHB 7 in the second frame period Frame #2, and detects data DATA output from the third pen Pen #3 and having the second signal frequency F2 that is the same as the second operation frequency F2, through the touch panel TSP.

However, because the touch driving circuit TDC detects data at the second operation frequency F2 during a third data sensing interval D3 corresponding to LHB 6 and LHB 7 in the second frame period Frame #2, and does not detect data DATA output from the first pen Pen #1 and having the first signal frequency F1 that is different from the second operation frequency F2, through the touch panel TSP.

Referring to FIGS. 17, 19, and 20, the touch driving circuit TDC may detect data at the second operation frequency F2 during a fourth data sensing interval D4 corresponding to LHB 10 and LHB 11 in the second frame period Frame #2, and may detect data DATA output from the fourth pen Pen #4 and having the second signal frequency F2 that is the same as the second operation frequency F2, through the touch panel TSP.

However, because the touch driving circuit TDC detects data at the second operation frequency F2 during a fourth data sensing interval D4 corresponding to LHB 10 and LHB 11 in the second frame period Frame #2, and does not detect data DATA output from the second pen Pen #2 and having the first signal frequency F1 that is different from the second operation frequency F2, through the touch panel TSP.

Although position sensing interval(s), tilt sensing interval(s), and data sensing interval(s) are included in one frame period in FIG. 17, one or more of position sensing interval(s), tilt sensing interval(s), and data sensing interval(s) may be included in one frame period.

The touch display device 100 according to the aspects of the present disclosure may include a touch panel TSP which, in order to provide multi-pen sensing based on frequency, includes a plurality of touch electrodes TE and receives a pen signal output from two or more pens, and a touch driving circuit TDC which detects a pen signal output from two or more pens Pen #1, Pen #2, . . . by sensing one or more of the plurality of touch electrodes TE.

The pen signal output from the two or more pens Pen #1, Pen #2, . . . may have different signals.

The touch driving circuit TDC may detect a signal by sequentially operating at two or more operation frequencies OF, and may detect a pen signal having the same signal frequency SF as each operation frequency OF.

Figure 21:
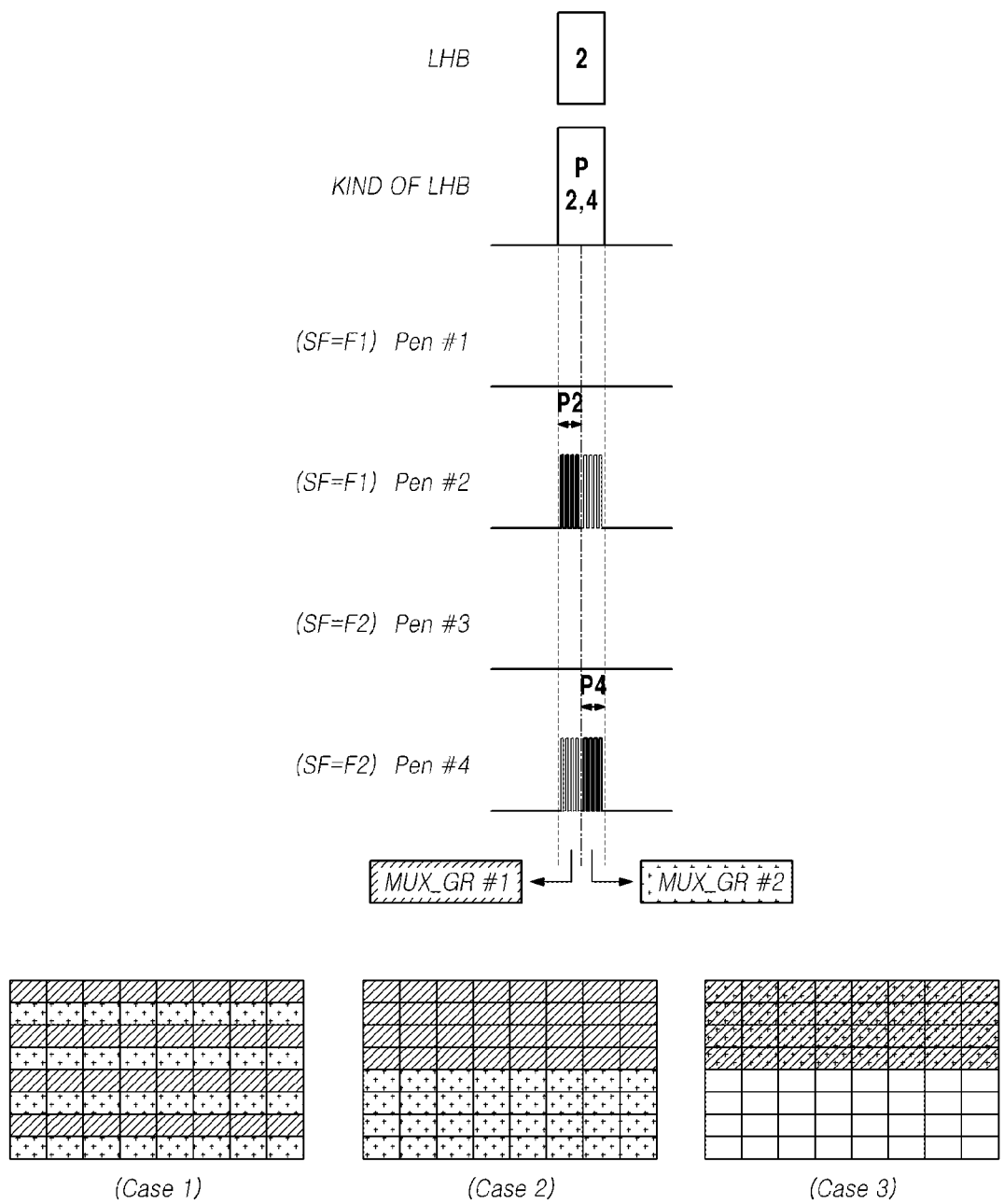
FIG. 21 is a view illustrating multiplexing driving schemes of a touch display device according to aspects of the present disclosure.

FIG. 21 is a view illustrating multiplexing driving schemes of a touch display device 100 according to aspects of the present disclosure.

As described above with reference to FIGS. 13 to 20, when the first position sensing interval P1,3 corresponding to one touch interval LHB is divided into first and second time division position sensing intervals P1 and P3, the touch driving circuit TDC may detect a signal through a first touch electrode group MUX_GR #1 of the touch panel TSP during the first time division position sensing interval P1, and may detect a signal through a second touch electrode group MUX_GR #2 of the touch panel TSP during the third time division position sensing interval P3.

As described above with reference to FIGS. 13 to 20, when the second position sensing interval P2,4 corresponding to one touch interval LHB is divided into second and fourth time division position sensing intervals P2 and P4, the touch driving circuit TDC may detect a signal through the first touch electrode group MUX_GR #1 of the touch panel TSP during the second time division position sensing interval P2, and may detect a signal through the second touch electrode group MUX_GR #2 of the touch panel TSP during the fourth time division position sensing interval P4.

The first touch electrode group MUX_GR #1 is a group of touch electrodes TE that may be simultaneously sensed by the plurality of sensing units SU. The second touch electrode group MUX_GR #2 is a group of touch electrodes TE that may be simultaneously sensed by the plurality of sensing units SU. The first touch electrode group MUX_GR #1 and the second touch electrode group MUX_GR #2 are sensed at different timings.

As in cases 1 and 2 of FIG. 21, the touch electrodes TE included in the first touch electrode group MUX_GR #1 and the touch electrodes TE included in the second touch electrode group MUX_GR #2 may be located in different areas of the touch panel TSP.

As in case 3 of FIG. 21, the touch electrodes TE included in the first touch electrode group MUX_GR #1 and the touch electrodes TE included in the second touch electrode group MUX_GR #2 may be located in the same of the touch panel TSP.

Accordingly, the touch display device 100 may increase the report rate by repeatedly sensing the same area of the touch panel TSP two times.

Figure 22:
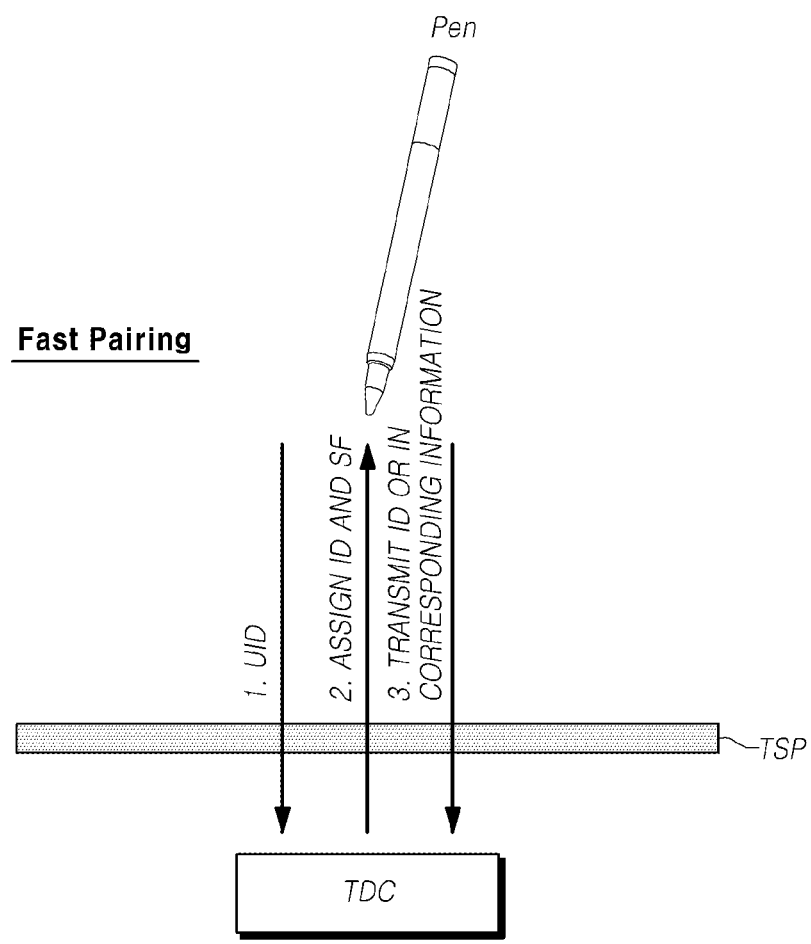
FIG. 22 is a view illustrating fast pairing of a touch display device according to aspects of the present disclosure.

FIG. 22 is a view illustrating fast pairing of a touch display device 100 according to aspects of the present disclosure.

Referring to FIG. 22, if an input of a pen is made in a pen searching process, the touch display device 100 requests a unique ID UID of the pen from the pen and receives the unique ID UID. The unique ID UID of the pen is unique identification information given to the pen by the pen manufacturer, and is identification information that helps identify the pen even in a state in which the pen does not communicate with the touch display device 100.

The touch display device 100 assigns a temporary ID of the pen that is to be used in a communication process for the pen sensing if receiving the unique ID UID of the pen. The temporary ID assigned to the pen by the touch display device 100 is temporary identification information that is available only in a state in which the pen communicates with the touch display device 100. The bit unit of the temporary ID of the pen may be smaller than the bit unit of the unique ID UID of the pen.

For the above-described multi-pen sensing, the touch display device 100 may assign a signal frequency SF that is to be used by the pen if receiving the unique ID UID of the pen.

The touch display device 100 may inform the pen of information on the temporary ID assigned to the pen and the signal frequency SF, through a beacon signal BCON. The process is called pairing between the touch display device 100 and the pen.

In the data sensing interval, the pen may transmit the temporary ID or information corresponding to the temporary ID to the touch display device 100 while containing the temporary ID or the corresponding information in the data DATA. Accordingly, during the communication, fast pairing may be provided.

Figure 23:
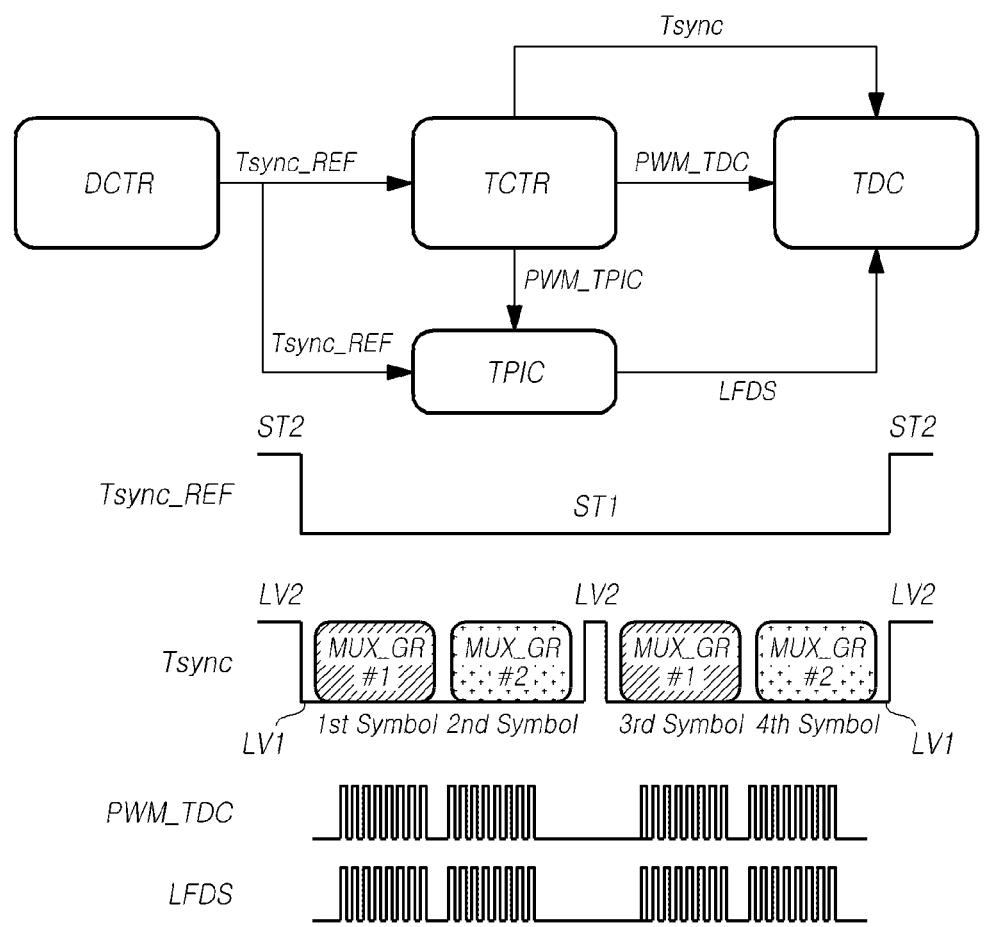
FIG. 23 is a view illustrating a driving method for enhancing a touch/pen report rate of a touch display device according to aspects of the present disclosure.

FIG. 23 is a view illustrating a driving method for enhancing a touch/pen report rate of a touch display device 100 according to aspects of the present disclosure.

Referring to FIG. 23, the touch driving circuit TDC may perform a signal detecting operation according to a touch synchronization signal Tsync in which a first voltage level interval LV1 and a second voltage level interval LV2 are repeated.

For example, the first voltage level interval LV1 may be a low level voltage interval, and the second voltage level interval LV2 may be a high level voltage interval. To the contrary, the first voltage level interval LV1 may be a high level voltage interval, and the second voltage level interval LV2 may be a low level voltage interval.

Referring to FIG. 23, the touch controller TCTR may generate a touch synchronization signal Tsync in which the first voltage level interval LV1 and the second voltage level interval LV2 are repeated and supply the touch synchronization signal Tsync to the touch driving circuit TDC, based on a reference touch synchronization signal Tsync_REF in which a first state interval ST1 that defines a touch interval and a second state interval ST2 that defines a non-touch interval are repeated.

The first state interval ST1 may be a low level voltage interval, and the second state interval ST2 may be a high level voltage interval. To the contrary, the first state interval ST1 may be a high level voltage interval, and the second state interval ST2 may be a low level voltage interval.

One first state interval ST1 of the reference touch synchronization signal Tsync_REF may correspond to two or more first voltage level intervals LV1 and one or more second voltage level intervals VL2.

One of the two or more first voltage level intervals LV1 may include a first time division position sensing interval P1 and a third time division position sensing interval P2, and the other may include a second time division position sensing interval P2 and a fourth time division position sensing interval P4.

One of the two or more first voltage level intervals LV1 may include a first time division tilt sensing interval T1 and a third time division tilt sensing interval T2, and the other may include a second time division tilt sensing interval T2 and a fourth time division tilt sensing interval T4.

For example, as illustrated in FIG. 23, one first state interval ST1 of the reference touch synchronization signal Tsync_REF may correspond to two first voltage level intervals LV1 and one second voltage level interval VL2.

The touch driving circuit TDC may sense the first touch electrode group MUX_GR #1 and the second touch electrode group MUX_GR #2 during the two first voltage level intervals LV1.

The touch controller TCTR may supply a pulse width modulation signal PWM_TDC to the touch driving circuit TDC. The pulse width modulation signal PWM_TPIC may be used as a touch driving signal TDS.

The touch power circuit TPIC may generate a load free driving signal LFDS based on the pulse width modulation signal PWM_TPIC received from the touch controller TCTR and the reference touch synchronization signal Tsync_REF received from the display controller DCTR, and may supply the load free driving signal LFDS to the touch driving circuit TDC.

If the touch driving circuit TDC drives the touch panel TSP by using the reference touch synchronization signal Tsync_REF in which the first state interval ST1 that defines a touch interval and the second state interval ST2 that defines a non-touch interval are repeated, the touch driving circuit TDC may sense the first touch electrode group MUX_GR #1 and the second touch electrode group MUX_GR #2 during the first state interval ST1.

However, if the touch driving circuit TDC drives the touch panel TSP by using a touch synchronization signal Tsync newly generated based on the reference touch synchronization signal Tsync_REF, the touch driving circuit TDC may sense the first touch electrode group MUX_GR #1 and the seconds touch electrode group MUX_GR #2 two times during the first state interval ST1. Accordingly, the touch and pen report rate may be increased.

Figure 24:
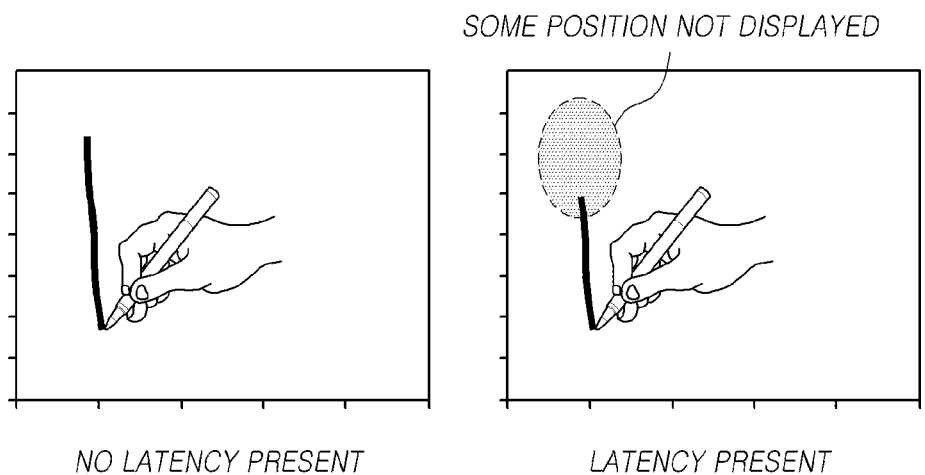
FIG. 24 is a view illustrating an issue of losing a position of a pen when the pen is sensed by a touch display device according to aspects of the present disclosure.

FIG. 24 is a view illustrating an issue of losing position of a pen when the pen is sensed by a touch display device 100 according to aspects of the present disclosure.

Referring to FIG. 24, when the pen rapidly contacts the touch panel TSP as the search rate, at which it may be determined whether an input by the pen or the finger is made, is restrictive to a predetermined speed (e.g., 60 Hz), some pen positions may be lost as the input of the pen is slowly responsive due to a search latency and the like.

In the following, a prompt search providing method for solving the pen position loss issue will be described.

Figure 25:
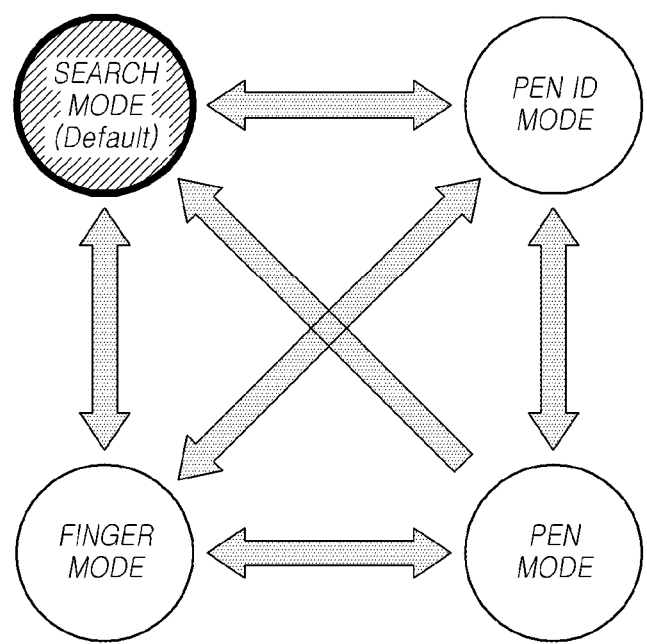
FIG. 25 is a view illustrating the degrees of transition for operation modes of a touch display device according to aspects of the present disclosure.
Figure 26:
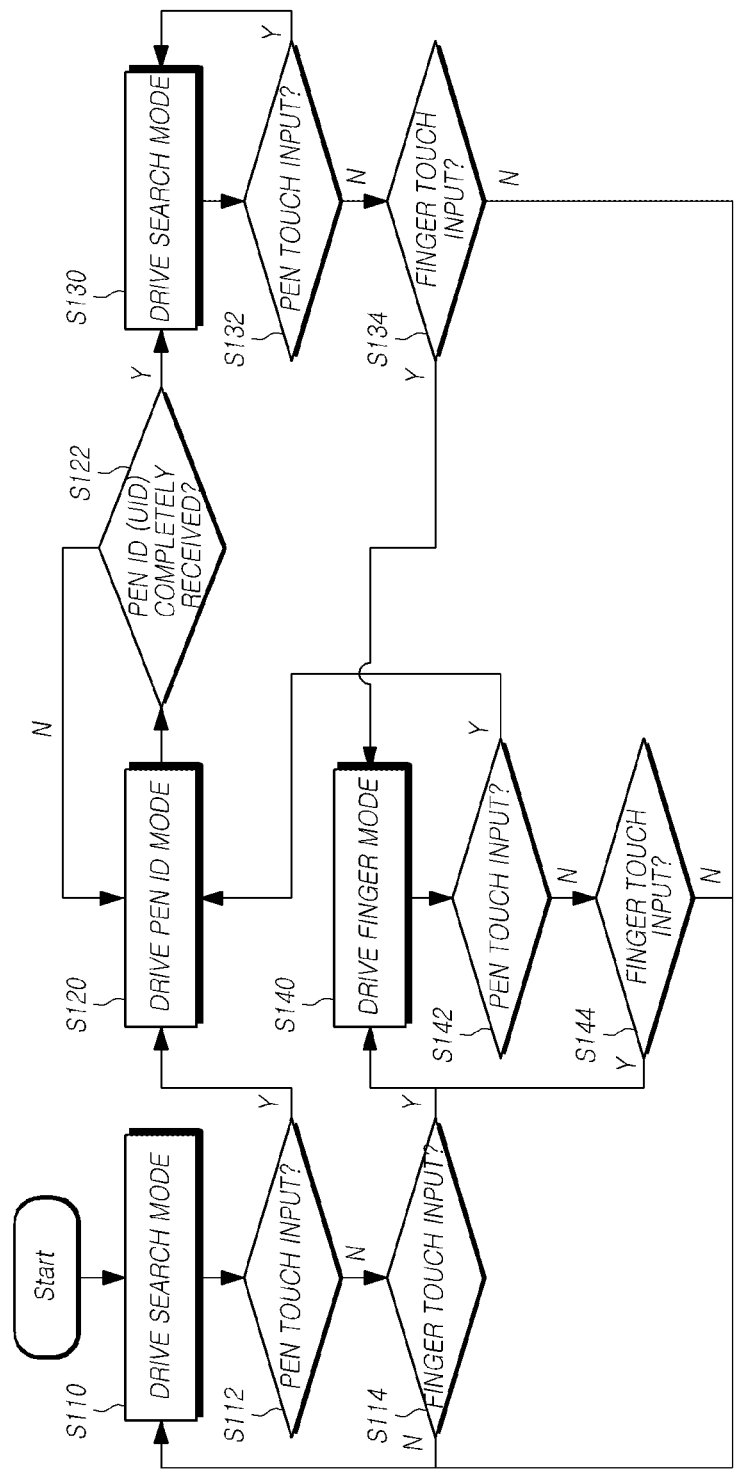
FIG. 26 is a flowchart illustrating transition methods for operation modes of a touch display device according to aspects of the present disclosure.

FIG. 25 is a view illustrating the degrees of transition for operation modes of a touch display device 100 according to aspects of the present disclosure. FIG. 26 is a flowchart illustrating transition methods for operation modes of a touch display device 100 according to aspects of the present disclosure.

Referring to FIG. 25, the operation modes of the touch display device 100 may include a search mode that is a default mode and operates when there is no touch input by a finger or a pen, a pen ID mode for receiving a pen ID UID when a touch input by a pen is made, a pen mode for sensing one or more of the position, the tilt, and data of the pen if the pen ID is received, and a finger mode for sensing a touch by the finger when a touch input by the finger is made.

The driving timing diagrams of FIGS. 14 and 17 are driving timing diagrams when the touch driving circuit TDC is in the pen mode.

Referring to FIG. 26, the touch display device 100 is driven in the search mode when there is no touch input by a finger and a pen (S110).

The touch display device 100 determines whether a pen touch input and a finger touch input are made while being driven in the search mode (S112, S114), is driven in the pen ID mode if it is determined in the determination result that a pen touch input is made (S120), and is driven in the finger mode if a finger touch input is made (S140).

The touch display device 100 is driven in the pen ID mode to determine whether the unique ID UID of the pen is received from the pen (S122).

The touch display device 100 is driven in the pen mode if the unique ID (UID) of the pen is received from the pen (S130).

The touch display device 100 determines whether a pen touch input is continuously made during the driving of the pen mode (S132), and if the pen touch input is continuously made, the pen mode is continuously driven (S130).

The touch display device 100 determines whether a pen touch input is continuously made during the driving of the pen mode (S132), and if the pen touch input is not made any more, it is determined whether a finger touch input is made (S134).

The touch display device 100 drives the search mode again (S110) if it is determined in the determination result of operation S134 that there is no finger touch input.

The touch display device 100 drives the finger mode again (S140) if it is determined in the determination result of operation S134 that there is a finger touch input.

The touch display device 100 determines whether a pen touch input is made during the finger mode driving (S140) (S142), and drives the pen ID mode if there is not pen touch input in the determination result of operation S142 (S120).

The touch display device 100 determines whether there is a finger touch input (S144) if there is not pen touch input in the determination result of operation S142, continuously drives the finger mode (S140) if a finger touch input is continuously made, and drives the search mode again (S110) if the finger touch input disappears.

FIG. 27 is a diagram of driving timings for operation modes of a touch display device 100 according to aspects of the present disclosure.

Referring to FIG. 27, during the search mode, K touch intervals LHB 1 to LHB 16 in one frame period may include one or more beacon transmission intervals B, n or more finger sensing intervals F, and m pen position sensing intervals P (n≥1, m≥1, and K≥3).

During n or more finger sensing intervals F in the search mode, a touch driving signal TDS, the voltage level of which swings, may be applied to the plurality of touch electrodes TE during m pen position sensing intervals P, a DC voltage may be applied to the plurality of touch electrodes TE.

During the search mode, due to the characteristics of the pen sensing, the number m of the pen position sensing intervals P is larger than the number of the beacon transmission intervals B, and also is larger than the number n of the finger sensing intervals F.

Referring to FIG. 27, during the finger mode, K touch intervals LHB 1 to LHB 16 in one frame period may include one or more beacon transmission intervals B, n or more finger sensing intervals F, and m pen position sensing intervals P (n≥1, m≥1, and K≥3).

During the finger mode, the number n of the finger sensing intervals F is larger than the number m of the pen position sensing intervals P and is larger than the number of the beacon transmission intervals B.

Referring to FIG. 27, during the pen mode, K touch intervals LHB 1 to LHB 16 in one frame period may include one or more beacon transmission interval B, one or more finger sensing interval F, one or more pen position sensing interval P, one or more pen tilt sensing interval T, and one or more pen data sensing interval D.

The number of the pen data sensing intervals D may vary according to the kind and the amount of the information included in the data.

Referring to FIG. 27, during the pen mode, K touch intervals LHB 1 to LHB 16 in one frame period may include one or more beacon transmission interval B, one or more finger sensing interval F, one or more pen position sensing interval P, one or more pen tilt sensing interval T, and one or more pen data sensing interval D. During the pen ID mode, the number of the pen data sensing intervals D is largest.

Figure 28:
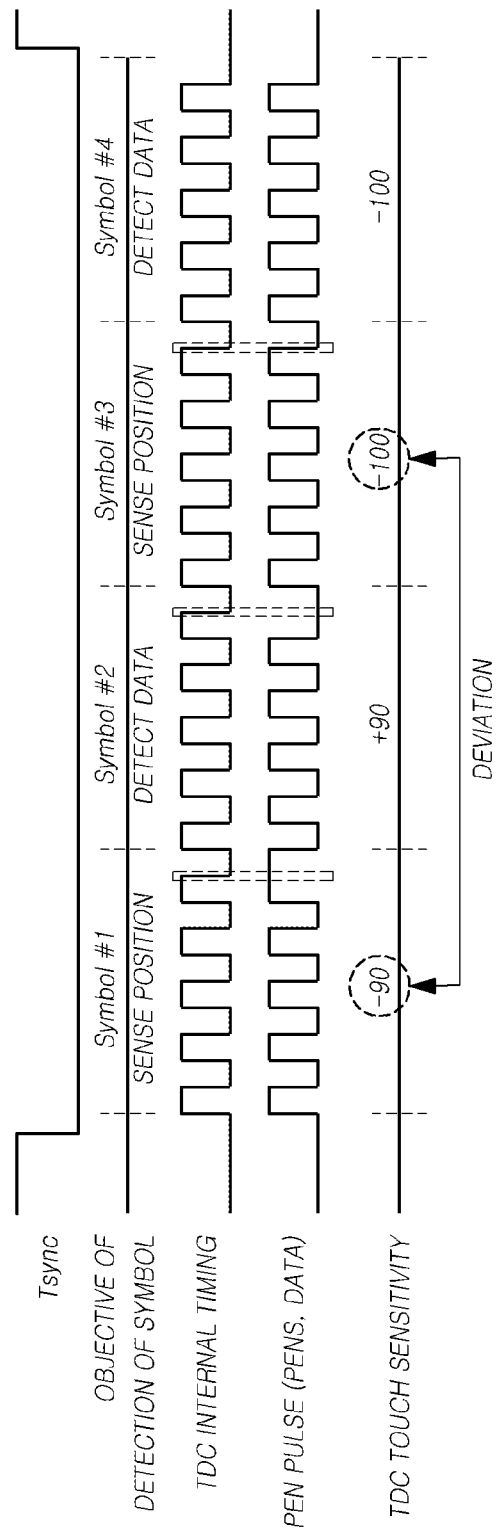
FIG. 28 is a view illustrating a sensitivity decreasing issue when a pen is sensed by a touch display device according to aspects of the present disclosure.

FIG. 28 is a view illustrating a sensitivity decreasing issue when a pen is sensed by a touch display device 100 according to aspects of the present disclosure.

Referring to FIG. 28, if receiving pen pulses, the touch driving circuit TDC detects symbols (Symbol #1, Symbol #2, Symbol #3, and Symbol #4) expressed by pen pulses to sense the pen position and the pen data, based on internal operation timings.

Referring to FIG. 28, the pen drives several symbols Symbol #1 to Symbol #4 during one touch interval LHB in a phase shift key (PSK) scheme. Through this, the touch display device 100 detects the position and data DATA of the pen.

According to the example of FIG. 28, when the first symbol Symbol #1 is changed to the second symbol Symbol #2, the phase of the pen pulse is changed. When the second symbol Symbol #2 is changed to the third symbol Symbol #3, the phase of the pen pulse is changed. When the third symbol Symbol #3 is changed to the fourth symbol Symbol #4, the phase of the pen pulse is not changed.

When the phase of the pen pulse is changed, the number of toggles of the pen pulse decreases as compared with when there is no phase change.

Accordingly, when there is a phase change of the pen pulse, the intensity of the pen touch sensitivity detected by the touch display device 100 decreases as compared with when there is not phase change. Referring to FIG. 28, the sensitivities (−90, +90) of the first symbol Symbol #1 and the second symbol Symbol #2 are lower than the sensitivities (−100, −100) of the third symbol Symbol #3 and the fourth symbol Symbol #4.

In particular, the change of the detection sensitivity generated by the phase change of the pen pulse may generate distortion of the position of the pen. Referring to FIG. 28, the deviation between the sensitivity (−90) of the first symbol Symbol #1 for the position sensing and the sensitivity (−100) of the third symbol Symbol #3 may greatly influence the pen position.

Figure 29:
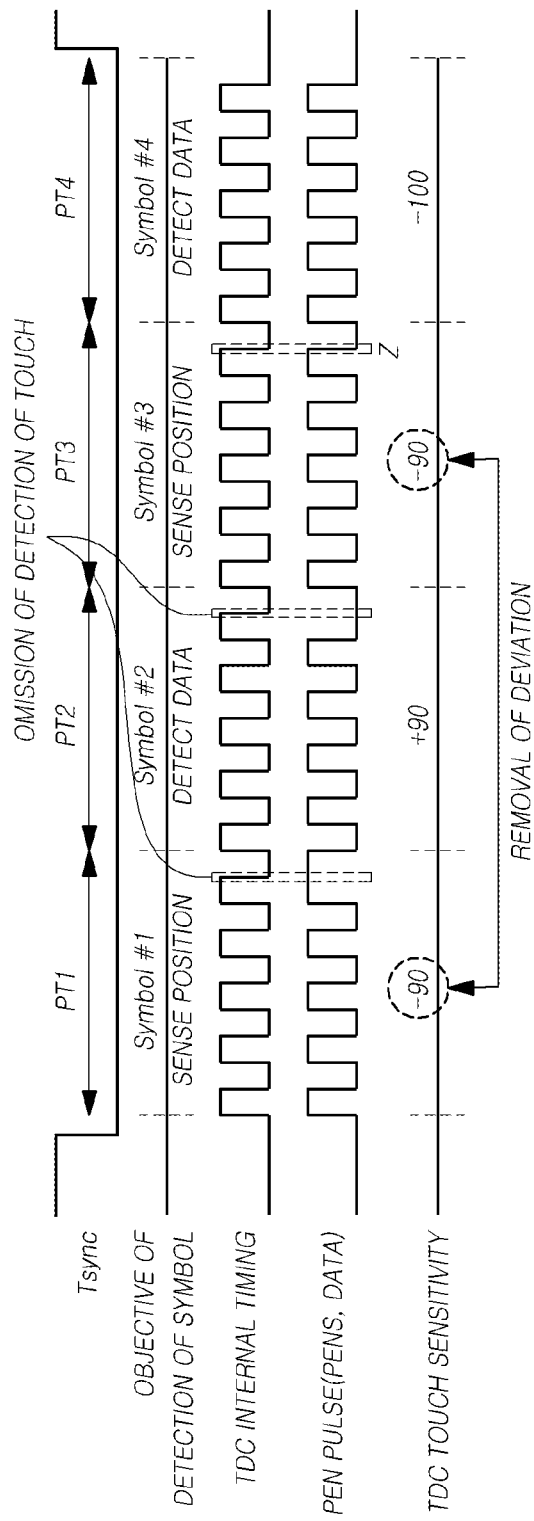
FIG. 29 is a view illustrating a sensitivity enhancing method when a pen is sensed by a touch display device according to aspects of the present disclosure.

FIG. 29 is a view illustrating a sensitivity enhancing method when a pen is sensed by a touch display device 100 according to aspects of the present disclosure.

Referring to FIG. 29, in order to remove a change of the touch sensitivity by the phase change of the pen pulse, the touch display device 100 does not detect a touch at a time point at which a symbol changes.

The touch display device 100 secures the maximum sensitivity by touch detecting all pulses in the case of detection of pen data that does not require position detection.

Referring to FIG. 29, each touch interval LHB includes three or more division intervals PT1, PT2, PT3, and PT4. In each of the three or more division intervals PT1, PT2, PT3, and PT4, a pen signal (pen pulse) including a plurality of pulses is applied to one or more touch electrodes TE.

For example, the three or more division intervals PT1, PT2, PT3, and PT4 may be time division sensing intervals obtained by time-dividing the touch interval LHB for multi-pen sensing.

A plurality of pulses included in a pen signal in each of the three or more division intervals PT1, PT2, PT3, and PT4 express one symbol. For example, the pen pulses in the first division interval PT1 express the first symbol Symbol #1. The pen pulses in the second division interval PT2 express the second symbol Symbol #2. The pen pulses in the third division interval PT3 express the third symbol Symbol #3. The pen pulses in the fourth division interval PT4 express the fourth symbol Symbol #4.

The touch driving circuit TDC may detect a signal based on the pen pulses during a time period, except for a symbol change time point related to the pen position sensing.

For example, referring to FIG. 29, when the first symbol Symbol #1 related to the position sensing is changed to the second symbol Symbol #2, the phase of the pen pulse changes. When the second symbol Symbol #2 is changed to the third symbol Symbol #3, the phase of the pen pulse is changed. When the third symbol Symbol #3 related to the position sensing is changed to the fourth symbol Symbol #4, the phase of the pen pulse is not changed.

The touch driving circuit TDC does not detect a signal for the final pulse part corresponding to the first symbol Symbol #1 related to the position sensing. The touch driving circuit TDC does not detect a signal for the final pulse part corresponding to the third symbol Symbol #3 related to the position sensing.

According to the above description, the deviation between the sensitivity (−90) of the first symbol Symbol #1 for the position sensing and the sensitivity (−90) of the third symbol Symbol #3 may be removed to prevent a distortion for the pen position.

Figure 30:
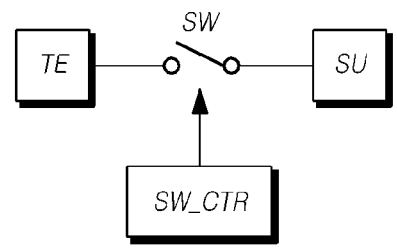
FIGS. 30 and 31 are views illustrating a control method for enhancing sensitivity when a pen is sensed by a touch display device according to aspects of the present disclosure.
Figure 31:
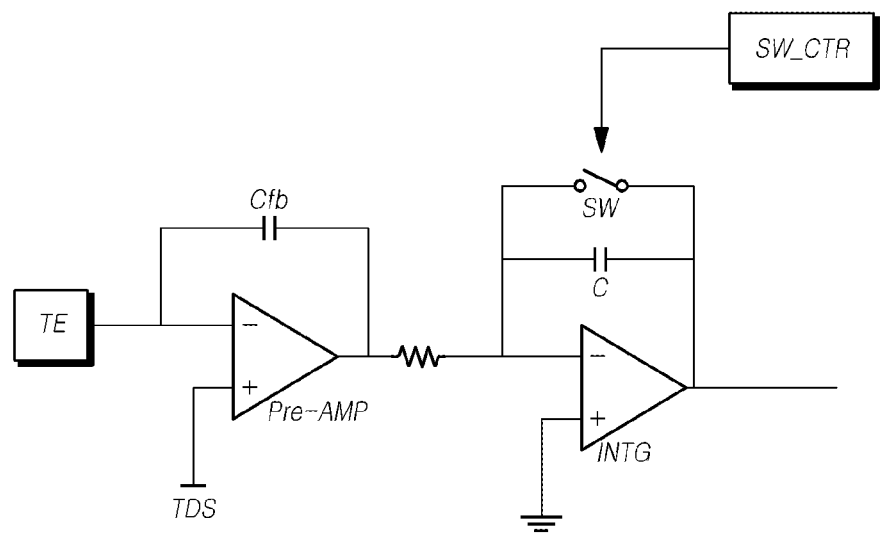

FIGS. 30 and 31 are views illustrating a control method for enhancing sensitivity when a pen is sensed by a touch display device 100 according to aspects of the present disclosure.

According to the example of FIG. 29, the touch driving circuit TDC does not detect a signal for the final pulse parts corresponding to the first symbol Symbol #1 related to the position sensing and the third symbol Symbol #3.

To achieve this, as illustrated in FIG. 30, the switch controller SW_CTR may turn off a switch SW that controls connection between the corresponding touch electrode TE and the sensing unit SU in advance before a predetermined turn-off time point at a time point at which the first symbol Symbol #1 corresponding to the first division interval PT1 is changed. The switch controller SW_CTR may turn off a switch SW that controls connection between the corresponding touch electrode TE and the sensing unit SU in advance before a predetermined turn-off time point at a time point at which the third symbol Symbol #3 corresponding to the third division interval PT3 is changed.

The above-mentioned switch SW may be a switch included in the first multiplexer circuit MUX1 of FIG. 4.

For a scheme that is different from the scheme of FIG. 30, the touch driving circuit TDC may include a switch SW connected between an input terminal and an output terminal of the integrator INTG included in each sensing unit SU.

The switch controller SW_CTR may control an on/off operation of the switch SW.

The switch controller SW_CTR may turn off a switch SW that controls connection between the corresponding touch electrode TE and the sensing unit SU in advance before a predetermined turn-off time point at a time point at which the first symbol Symbol #1 corresponding to the first division interval PT1 is changed. The switch controller SW_CTR may turn off a switch SW that controls connection between the corresponding touch electrode TE and the sensing unit SU in advance before a predetermined turn-off time point at a time point at which the third symbol Symbol #3 corresponding to the third division interval PT3 is changed.

According to the above-described aspects of the present disclosure, a touch display device 100 that may effectively sense a larger number of pens and a touch sensing circuit may be provided.

According to the aspects of the present disclosure, a touch display device 100 that performs multiplexing, by which sensing speed may be increased, and a touch sensing circuit may be provided.

According to the aspects of the present disclosure, a touch display device 100 that performs multiplexing, by which pen search speed may be increased, and a touch sensing circuit may be provided.

According to the aspects of the present disclosure, a touch display device 100 that performs multiplexing, by which distortion of the position of a pen may be prevented, and a touch sensing circuit may be provided.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A touch display device comprising:
a touch panel including a plurality of touch electrodes; and
a touch driving circuit configured to sense one or more of the plurality of touch electrodes,
wherein the touch driving circuit has an operation period including a plurality of touch intervals that includes a first sensing interval and a second sensing interval, and the first sensing interval includes at least a first time division sensing interval and the second sensing interval includes at least a second time division sensing interval,
wherein the touch driving circuit is configured to detect a first pen signal output from a first pen through one or more touch electrodes of the plurality of touch electrodes during the first time division sensing interval, and detect a second pen signal output from a second pen through one or more touch electrodes of the plurality of touch electrodes during the second time division sensing interval,
wherein the touch driving circuit is further configured to:
detect a third pen signal output from the first pen and having a first signal frequency through one or more touch electrodes during the first time division sensing interval; and
detect a fourth pen signal output from the second pen and having the first signal frequency through one or more touch electrodes during the second time division sensing interval,
wherein the first sensing interval further comprises a third time division sensing interval, and
wherein, when a third pen, which is different from the first pen and the second pen, is discovered, the touch driving circuit is configured to detect a fifth pen signal output from the third pen and having a second signal frequency, which is different from the first signal frequency, through one or more touch electrodes during the third time division sensing interval.

2. The touch display device of claim 1, wherein the touch driving circuit is further configured to:
   detect first data from the first pen during a first data sensing interval; and
   detect second data from the second pen during a second data sensing interval.

3. The touch display device of claim 2, wherein the touch driving circuit is configured to detect third data from the third pen during a third data sensing interval.

4. The touch display device of claim 3, wherein the second sensing interval further includes a fourth time division sensing interval, wherein the touch driving circuit detects a sixth pen signal from a fourth pen different from the first to third pens during the fourth time division sensing interval, and
   wherein the first and second sensing intervals are first and second position sensing intervals and the first to fourth time division sensing intervals are first to fourth time division position sensing intervals.

5. The touch display device of claim 3, wherein the second sensing interval further includes a fourth time division sensing interval, wherein the touch driving circuit detects a seventh pen signal during the fourth time division sensing interval, and
   wherein the first and second sensing intervals are first and second tilt sensing intervals and the first to fourth time division sensing intervals are first to fourth time division tilt sensing intervals.

6. The touch display device of claim 3, wherein the second sensing interval further includes a fourth time division sensing interval, wherein the touch driving circuit detects an eighth pen signal during the fourth time division sensing interval,
   wherein the first and second sensing intervals include first and second position sensing intervals and the first to fourth time division sensing intervals include first to fourth time division position sensing intervals, and
   wherein the first and second sensing intervals further include first and second tilt sensing intervals and the first to fourth time division sensing intervals further include first to fourth time division tilt sensing intervals.

7. The touch display device of claim 1, further comprising:
   a touch controller configured to, based on a reference touch synchronization signal in which a first state interval defining a touch interval and a second state interval defining a non-touch interval are repeated, generate a touch synchronization signal in which a first voltage level interval and a second voltage level interval are repeated, and supply the touch synchronization signal to the touch driving circuit,
   wherein one first state interval in the reference touch synchronization signal corresponds to two or more first voltage level intervals and one or more second voltage level intervals.

8. The touch display device of claim 7, wherein the first sensing interval further includes a third time division sensing interval, and the second sensing interval further includes a fourth time division sensing interval, and
   wherein one of the two or more first voltage level intervals includes the first time division sensing interval and the third time division sensing interval, and another of the two or more first voltage level intervals comprises the second time division sensing interval and the fourth time division sensing interval.

9. The touch display device of claim 1, wherein operation modes of the touch display device comprise:
   a search mode which is a default mode and operates when no touch input by a finger and a pen is made;
   a pen ID mode for receiving a pen ID when a touch input by the pen is made;
   a pen mode for sensing one or more of the position, the tilt, and data of the pen if the pen ID is received; and
   a finger mode for sensing a touch by the finger if a touch input by the finger is made, and
   the first sensing interval and the second sensing interval correspond to touch intervals when the touch driving circuit is in the pen mode.

10. The touch display device of claim 9, wherein during the search mode, K touch intervals in one frame period comprises one or more beacon transmission intervals, n or more finger sensing intervals, and m pen position sensing intervals, wherein $n \geq 1$, $m \geq 1$, and $K \geq 3$,
    during the n or more finger sensing intervals, a touch driving signal, the voltage level of which swings, is applied to the plurality of touch electrodes, and
    during the m pen position sensing intervals, a DC voltage is applied to the plurality of touch electrodes.

11. The touch display device of claim 1, wherein each of the plurality of touch intervals comprises three or more division intervals,
    a pen signal comprising a plurality of pulses is applied to one or more touch electrodes in each of the three or more division intervals,
    the plurality of pulses included in the pen signal in each of the three or more division intervals express one symbol, and
    the touch driving circuit detects the pen signal based on pen pulses during a period, except for a symbol change time point related to position sensing.

12. A touch display device comprising:
    a touch panel including a plurality of touch electrodes; and
    a touch driving circuit configured to sense one or more of the plurality of touch electrodes,
    wherein the touch driving circuit has an operation period including a plurality of touch intervals that includes a first sensing interval and a second sensing interval, and the first sensing interval includes at least a first time division sensing interval and the second sensing interval includes at least a second time division sensing interval,
    wherein the touch driving circuit is configured to detect a first pen signal output from a first pen through one or more touch electrodes of the plurality of touch electrodes during the first time division sensing interval, and detect a second pen signal output from a second pen through one or more touch electrodes of the plurality of touch electrodes during the second time division sensing interval,
    wherein the touch driving circuit is further configured to:
    detect a third pen signal output from the first pen and having a first signal frequency through one or more touch electrodes during the first time division sensing interval; and
    detect a fourth pen signal output from the second pen and having the first signal frequency through one or more touch electrodes during the second time division sensing interval, wherein the plurality of touch intervals further includes a first data sensing interval and a second data sensing interval, and wherein the touch driving circuit is configured to:

detect a first data output from the first pen and having the first signal frequency through one or more touch electrodes during the first data sensing interval; and detect a second data output from the second pen and having the first signal frequency through one or more touch electrodes during the second data sensing interval.

13. The touch display device of claim 12, wherein the plurality of touch intervals further includes a third data sensing interval, and wherein, when a third pen, which is different from the first pen and the second pen, is discovered, the touch driving circuit is configured to:

detect a third data output from the third pen and having a second signal frequency, which is different from the first signal frequency, through one or more touch electrodes during the third data sensing interval.

14. The touch display device of claim 13, wherein the plurality of touch intervals further includes a fourth data sensing interval, and wherein the first data sensing interval and the second data sensing interval are included in a first frame period, and the third data sensing interval and the fourth data sensing interval are included in a second frame period, which is different from the first frame period.

15. The touch display device of claim 12, wherein the first data output from the first pen comprises a pen ID of the first pen, and the second data output from the second pen comprises a pen ID of the second pen.

16. The touch display device of claim 12, wherein temporal lengths of the first and second time division sensing intervals are shorter than those of the first and second data sensing intervals.

17. A touch display device comprising:

a touch panel including a plurality of touch electrodes; and a touch driving circuit configured to sense one or more of the plurality of touch electrodes, wherein the touch driving circuit has an operation period including a plurality of touch intervals that includes a first sensing interval and a second sensing interval, and the first sensing interval includes at least a first time division sensing interval and the second sensing interval includes at least a second time division sensing interval, wherein the touch driving circuit is configured to detect a pen signal output from a first pen through one or more touch electrodes of the plurality of touch electrodes during the first time division sensing interval, and detect a pen signal output from a second pen through one or more touch electrodes of the plurality of touch electrodes during the second time division sensing interval, wherein the first sensing interval further includes a third time division sensing interval, and the second sensing interval further includes a fourth time division sensing interval, and wherein the touch driving circuit is configured to:

detect a first signal through a first touch electrode group of the touch panel during the first time division sensing interval;

detect a second signal through a second touch electrode group of the touch panel during the third time division sensing interval;

detect a third signal through the first touch electrode group of the touch panel during the second time division sensing interval; and detect a fourth signal through the second touch electrode group of the touch panel during the fourth time division sensing interval.

18. The touch display device of claim 17, wherein touch electrodes included in the first touch electrode group and touch electrodes included in the second touch electrode group are touch electrodes located in different areas of the touch panel.

19. The touch display device of claim 17, wherein touch electrodes included in the first touch electrode group and touch electrodes included in the second touch electrode group are the same touch electrodes.

20. A touch sensing circuit comprising:

a first circuit configured to sense one or more of a plurality of touch electrodes disposed in a touch panel and output sensing data; and a second circuit configured to sense one or more of the position, the tilt, and additional information of a pen based on the sensing data, wherein an operation period of the first circuit comprises a plurality of touch intervals, the plurality of touch intervals comprises a first sensing interval and a second sensing interval, the first sensing interval comprises at least a first time division sensing interval, the second sensing interval comprises at least a second time division sensing interval, and wherein the first circuit is configured to:

detect a first pen signal output from a first pen through one or more touch electrodes of the plurality of touch electrodes during the first time division sensing interval; and detect a second pen signal output from a second pen, which is different from the first pen, through one or more touch electrodes of the plurality of touch electrodes during the second time division sensing interval, wherein the first circuit is further configured to:

detect a third pen signal output from the first pen and having a first signal frequency through one or more touch electrodes during the first time division sensing interval; and detect a fourth pen signal output from the second pen and having the first signal frequency through one or more touch electrodes during the second time division sensing interval, wherein the first sensing interval further comprises a third time division sensing interval, and wherein, when a third pen, which is different from the first pen and the second pen, is discovered, the first circuit is configured to detect a fifth pen signal output from the third pen and having a second signal frequency, which is different from the first signal frequency, through one or more touch electrodes during the third time division sensing interval.

21. The touch display device of claim 20, wherein the first circuit is configured to:

detect a first data from the first pen during a first data sensing interval; and detect a second data from the second pen during a second data sensing interval.

* * * * *